US010833351B2

(12) United States Patent
Makino et al.

(10) Patent No.: US 10,833,351 B2
(45) Date of Patent: Nov. 10, 2020

(54) SOLID ELECTROLYTE COMPOSITION, SOLID ELECTROLYTE-CONTAINING SHEET, ALL-SOLID STATE SECONDARY BATTERY, AND METHODS FOR MANUFACTURING SOLID ELECTROLYTE COMPOSITION, SOLID ELECTROLYTE-CONTAINING SHEET, ALL-SOLID STATE SECONDARY BATTERY

(71) Applicant: FUJIFILM Corporation, Tokyo (JP)

(72) Inventors: Masaomi Makino, Kanagawa (JP); Hiroaki Mochizuki, Kanagawa (JP); Toshihiko Yawata, Kanagawa (JP); Tomonori Mimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 166 days.

(21) Appl. No.: 16/123,023

(22) Filed: Sep. 6, 2018

(65) Prior Publication Data

US 2019/0006700 A1 Jan. 3, 2019

Related U.S. Application Data

(63) Continuation of application No. PCT/JP2017/008845, filed on Mar. 6, 2017.

(30) Foreign Application Priority Data

Mar. 8, 2016 (JP) ................................ 2016-044282

(51) Int. Cl.
*H01M 10/052* (2010.01)
*H01M 10/056* (2010.01)
(Continued)

(52) U.S. Cl.
CPC ......... *H01M 10/052* (2013.01); *C08F 292/00* (2013.01); *H01B 1/06* (2013.01);
(Continued)

(58) Field of Classification Search
CPC ............ H01M 10/052; H01M 10/056; H01M 2300/0088; H01M 4/0407; H01M 4/0416; H01M 4/622
See application file for complete search history.

(56) References Cited

U.S. PATENT DOCUMENTS

2013/0260241 A1* 10/2013 Sone .................... H01M 4/622 429/217

FOREIGN PATENT DOCUMENTS

WO 2010/089891 A1 8/2010
WO 2011/102027 A1 8/2011
WO 2012/026583 A1 3/2012

OTHER PUBLICATIONS

Emura Katsuji, WO-2011102027 (Aug. 25, 2011), machine translation.*

(Continued)

*Primary Examiner* — Carlos Barcena
(74) *Attorney, Agent, or Firm* — Sughrue Mion, PLLC

(57) ABSTRACT

Provided are a solid electrolyte composition containing an inorganic solid electrolyte having a conductivity for ions of metals belonging to Group I or II of the periodic table and a compound having an anionic polymerizable functional group, a solid electrolyte-containing sheet containing an inorganic solid electrolyte having a conductivity for ions of metals belonging to Group I or II of the periodic table and an anionic polymer which bonds to the inorganic solid electrolyte, and an all-solid state secondary battery, and methods for manufacturing the solid electrolyte composition, the solid electrolyte-containing sheet, and the all-solid state secondary battery.

16 Claims, 1 Drawing Sheet

(51) Int. Cl.
*H01M 4/04* (2006.01)
*H01M 4/62* (2006.01)
*H01B 1/06* (2006.01)
*C08F 292/00* (2006.01)

(52) U.S. Cl.
CPC ....... *H01M 4/0407* (2013.01); *H01M 4/0416* (2013.01); *H01M 10/056* (2013.01); *H01M 4/622* (2013.01); *H01M 2300/0088* (2013.01); *Y02E 60/122* (2013.01); *Y02T 10/7011* (2013.01)

(56) References Cited

OTHER PUBLICATIONS

Communication dated Aug. 27, 2019, from the Japanese Patent Office in corresponding application No. 2018-504482.
International Search Report for PCT/JP2017/008845, dated Apr. 11, 2017.
International Preliminary Report on Patentability issued in International Application No. PCT/JP2017/008845 dated Jul. 20, 2017 [PCT/IPEA/409].
Written Opinion of the ISA issued in International Application No. PCT/JP2017/008845 dated Apr. 11, 2017 [PCT/ISA/237].

* cited by examiner

SOLID ELECTROLYTE COMPOSITION, SOLID ELECTROLYTE-CONTAINING SHEET, ALL-SOLID STATE SECONDARY BATTERY, AND METHODS FOR MANUFACTURING SOLID ELECTROLYTE COMPOSITION, SOLID ELECTROLYTE-CONTAINING SHEET, ALL-SOLID STATE SECONDARY BATTERY

CROSS-REFERENCE TO RELATED APPLICATIONS

This application is a Continuation of PCT International Application No. PCT/JP2017/008845 filed on Mar. 6, 2017, which claims priority under 35 U.S.C. § 119 (a) to Japanese Patent Application No. 2016-044282 filed in Japan on Mar. 8, 2016. Each of the above applications is hereby expressly incorporated by reference, in its entirety, into the present application.

BACKGROUND OF THE INVENTION

1. Field of the Invention

The present invention relates to a solid electrolyte composition, a solid electrolyte-containing sheet, an all-solid state secondary battery, and methods for manufacturing a solid electrolyte composition, a solid electrolyte-containing sheet, an all-solid state secondary battery.

2. Description of the Related Art

Lithium ion secondary batteries are storage batteries which have a negative electrode, a positive electrode, and an electrolyte sandwiched between the negative electrode and the positive electrode and which can be discharged and charged by lithium ions reciprocally migrating between both electrodes. In the related art, in lithium ion secondary batteries, organic electrolytic solutions have been used as electrolytes.

However, organic electrolytic solutions are likely to cause liquid leakage, additionally, there is a concern that over-charging or over-discharging may cause short circuits and ignition in batteries, and there is a demand for further improving reliability and safety.

In such a circumstance, all-solid state secondary batteries in which an inorganic solid electrolyte is used instead of an organic electrolytic solution are attracting attention. In all-solid state secondary batteries, all of the negative electrode, the electrolyte, and the positive electrode are made of a solid, safety or reliability which is a problem of batteries in which an organic electrolytic solution is used can be significantly improved, and it becomes possible to extend the service lives of batteries. Furthermore, to all-solid state secondary batteries, it is possible to provide a structure in which electrodes and an electrolyte are disposed in series in a direct arrangement. Therefore, compared with secondary batteries in which an organic electrolytic solution is used, it becomes possible to increase the energy density, and the application to electric vehicles, large-sized storage batteries, and the like is expected.

Due to the respective advantages described above, the development of all-solid state secondary batteries as next-generation lithium ion batteries is underway ("NEDO's Technology Development Roadmap 2013 for Next-Generation Car Storage (August, 2013)", Electricity Storage Technology Development Division, Advanced Battery and Hydrogen Technology Department, New Energy and Industrial Technology Development Organization (NEDO)). For these all-solid state secondary batteries, the formation of any layer of an active material layer of a negative electrode, a solid electrolyte layer, and an active material layer of a positive electrode using a material containing an inorganic solid electrolyte and/or an active material and the binder particles (bonding agent) of a specific polymer compound has been proposed. For example, WO2010/089891A describes a solid electrolyte material-containing sheet and a solid battery which are obtained by the application, radical polymerization, and curing of a composition containing a sulfide solid electrolyte material and a bonding agent composition having a monomer or oligomer having a double bond and a radical polymerization initiator. WO2012/026583A describes an all-solid state secondary battery containing a solid electrolyte and a polymer including a polymerization unit having a nitrile group in a specific proportion in any layers.

SUMMARY OF THE INVENTION

In recent years, rapid development has been underway for all-solid state secondary batteries, and performance required for all-solid state secondary batteries has also enhanced. Particularly, for all-solid state secondary batteries in which electrode active material layers and a solid electrolyte layer are formed of solid particles, there is a demand for enhancing the bonding property between solid particles in order to improve the cycle characteristics of the batteries.

An object of the present invention is to provide a solid electrolyte composition capable of improving the bonding property between solid particles and capable of improving the cycle characteristics in an all-solid state secondary battery. In addition, another object of the present invention is to provide a solid electrolyte-containing sheet and an all-solid state secondary battery which are excellent in terms of the bonding property and/or the cycle characteristics. Furthermore, still another object of the present invention is to provide methods for manufacturing the solid electrolyte composition, the solid electrolyte-containing sheet, and the all-solid state secondary battery respectively.

As a result of intensive studies, the present inventors found that an all-solid state secondary battery having a favorable bonding property between solid particles and having favorable cycle characteristics can be realized using a solid electrolyte composition containing a specific inorganic solid electrolyte and a compound having an anionic polymerizable functional group. The present invention has been completed by further repeating studies on the basis of the above-described finding.

That is, the above-described objects were achieved using the following means.

(1) A solid electrolyte composition comprising: an inorganic solid electrolyte having a conductivity for ions of metals belonging to Group I or II of the periodic table; and a compound having an anionic polymerizable functional group.

(2) The solid electrolyte composition according to (1), in which the compound having an anionic polymerizable functional group is represented by General Formula (1a) or (1b).

General Formula (1a)

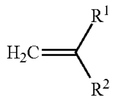

-continued

General Formula (1b)

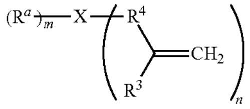

In the formula, $R^1$ to $R^3$ each independently represent a monovalent electron-withdrawing group, $R^4$ represents a divalent electron-withdrawing group in which a bonding portion with a carbon atom to which $R^3$ and $R^4$ bond withdraws electrons, and $R^a$ represents a hydrogen atom or an organic group. X represents an m+n-valent linking group, m is an integer of 0 to 10, and n is an integer of 2 to 10. $R^1$, $R^2$, $R^3$ and $R^4$ may link together to form a ring.

(3) The solid electrolyte composition according to (2), in which the compound having an anionic polymerizable functional group satisfies the following conditions.

(Conditions)

$R^1$ to $R^3$ each independently represent an alkyl group substituted with a nitro group, a cyano group, —C(═O)$OR^5$, —C(═O)$R^6$, or a fluoro group or an aryl group substituted with at least any one of a nitro group, a cyano group, —C(═O)$OR^5$, —C(═O)$R^6$, or a fluoro group, $R^4$ is an alkylene group substituted with *—C(═O)$OR^7$—, *—C(═O)$R^8$—, or a fluoro group or an arylene group substituted with at least any one of a nitro group, a cyano group, —C(═O)$OR^5$, —C(═O)$R^6$, or a fluoro group. $R^5$ and $R^6$ each are independently a hydrogen atom, an alkyl group, or an aryl group, and $R^7$ and $R^8$ each are independently a single bond, an alkylene group, or an arylene group. * represents the bonding portion with the carbon atom to which $R^3$ and $R^4$ bond.

(4) The solid electrolyte composition according to any one of (1) to (3), in which the compound having an anionic polymerizable functional group has two or more anionic polymerizable functional groups in a molecule.

(5) The solid electrolyte composition according to any one of (1) to (4), in which a molecular weight of the compound having an anionic polymerizable functional group is 100 or more and 1,000 or less.

(6) The solid electrolyte composition according to any one of (1) to (5), in which a content of the compound having an anionic polymerizable functional group is less than 2% by mass of total solid contents in the solid electrolyte composition.

(7) The solid electrolyte composition according to any one of (1) to (6), containing: a dispersion medium.

(8) The solid electrolyte composition according to any one of (1) to (7), containing: an active material.

(9) The solid electrolyte composition according to any one of (1) to (8), containing: a particle dispersant.

(10) The solid electrolyte composition according to any one of (1) to (9), in which the inorganic solid electrolyte is a sulfide-based inorganic solid electrolyte.

(11) A method for manufacturing a solid electrolyte composition, the method comprising: a step of dispersing an inorganic solid electrolyte in the presence of a dispersion medium so as to produce a slurry; and a step of adding a compound having an anionic polymerizable functional group to the obtained slurry.

(12) A solid electrolyte-containing sheet comprising: an inorganic solid electrolyte having a conductivity for ions of metals belonging to Group I or II of the periodic table; and an anionic polymer which bonds to the inorganic solid electrolyte and has a repeating unit represented by General Formula (2A) or (2B).

General Formula (2A)

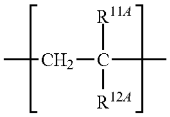

General Formula (2B)

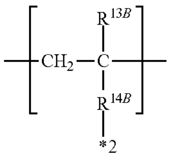

In the formula, $R^{11A}$ and $R^{12A}$ each independently represent a monovalent electron-withdrawing group, $R^{13B}$ represents a monovalent electron-withdrawing group or —$R^{14B}$—$*_2$, and $R^{14B}$ represents a divalent electron-withdrawing group in which a bonding portion with a carbon atom to which $R^{13B}$ and $R^{14B}$ bond withdraws electrons. $*_2$ represents a bonding site.

$R^{11A}$, $R^{12A}$, $R^{13B}$, and $R^{14B}$ may link together to form a ring.

(13) A method for manufacturing a solid electrolyte-containing sheet, the method comprising: a step of applying the solid electrolyte composition according to any one of (1) to (10) onto a base material to form a coating; and a step of curing the coating through progress of anionic polymerization.

(14) A method for manufacturing a solid electrolyte-containing sheet, the method comprising: a step of dispersing an inorganic solid electrolyte having a conductivity for ions of metals belonging to Group I or II of the periodic table in the presence of a dispersion medium so as to produce a slurry; a step of applying the obtained slurry onto a base material to form a coating; a step of applying a solution of a compound having an anionic polymerizable functional group onto the formed coating and infusing the solution into the coating so as to form a sheet; and a step of curing the formed sheet through progress of anionic polymerization.

(15) An all-solid state secondary battery comprising: a negative electrode active material layer; a solid electrolyte layer; and a positive electrode active material layer in this order, in which at least one layer of the negative electrode active material layer, the solid electrolyte layer, or the positive electrode active material layer contains an inorganic solid electrolyte having a conductivity for ions of metals belonging to Group I or II of the periodic table and an anionic polymer which bonds to the inorganic solid electrolyte and has a repeating unit represented by General Formula (2A) or (2B).

General Formula (2A)

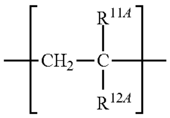

-continued

General Formula (2B)

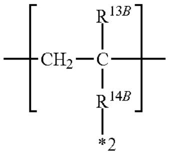

In the formula, $R^{11A}$ and $R^{12A}$ each independently represent a monovalent electron-withdrawing group, $R^{13B}$ represents a monovalent electron-withdrawing group or $—R^{14B}—*_2$, and $R^{14B}$ represents a divalent electron-withdrawing group in which a bonding portion with a carbon atom to which $R^{13B}$ and $R^{14B}$ bond withdraws electrons. $*_2$ represents a bonding site.

$R^{11A}$, $R^{12A}$, $R^{13B}$, and $R^{14B}$ may link together to form a ring.

(16) The all-solid state secondary battery according to (15), in which a proportion of a repeating unit containing a cyano group in the repeating unit represented by General Formula (2A) or (2B) is more than 30% by mass.

(17) A method for manufacturing an all-solid state secondary battery, in which an all-solid state secondary battery is manufactured using the method for manufacturing a solid electrolyte-containing sheet according to (13) or (14).

In the present specification, numerical ranges expressed using "to" include numerical values before and after "to" as the lower limit value and the upper limit value.

In the present specification, in the case of being simply expressed, "acryl" or "(meth)acryl" refers to methacryl and/or acryl. In addition, in the case of being simply expressed, "acryloyl" or "(meth)acryloyl" refers to methacryloyl and/or acryloyl.

In the present specification, in a case in which there is a plurality of substituents, linking groups, and the like (hereinafter, referred to as the substituents or the like) represented by a specific reference sign or a plurality of substituents or the like is simultaneously or alternatively regulated, the respective substituents or the like may be identical to or different from each other. What has been described above shall apply the regulation of the number of the substituents or the like.

In the present specification, unless particularly otherwise described, mass-average molecular weights (Mw) can be measured as the polystyrene-equivalent molecular weight by means of GPC. At this time, the polystyrene-equivalent molecular weight is detected by means of RI using a GPC apparatus HLC-8220 (manufactured by Tosoh Corporation) and G3000HXL+G2000HXL as columns at 23° C. and a flow rate of 1 mL/min. An eluent can be selected from tetrahydrofuran (THF), chloroform, N-methyl-2-pyrrolidone (NMP), and m-cresol/chloroform (manufactured by Shonanwako Junyaku), and THF is used in a case in which the polymer needs to be dissolved.

In the case of being used as a material for a solid electrolyte layer and/or an active material layer in an all-solid state secondary battery, the solid electrolyte composition of the present invention exhibits excellent effects of enhancing the bonding property between solid particles, suppressing an increase in the interface resistance between solid particles which is attributed to repetition of charging and discharging, and improving the cycle characteristics. In addition, the solid electrolyte-containing sheet and the all-solid state secondary battery of the present invention are excellent in terms of the bonding property and/or the cycle characteristics.

In addition, according to the manufacturing methods of the present invention, the solid electrolyte composition, the solid electrolyte-containing sheet, and the all-solid state secondary battery of the present invention can be preferably manufactured respectively.

The above-described characteristics and advantages and other characteristics and advantages of the present invention will be further clarified from the following description with reference to the appropriately accompanied drawings.

DESCRIPTION OF THE PREFERRED EMBODIMENTS

[Solid Electrolyte Composition]

Figure 1:
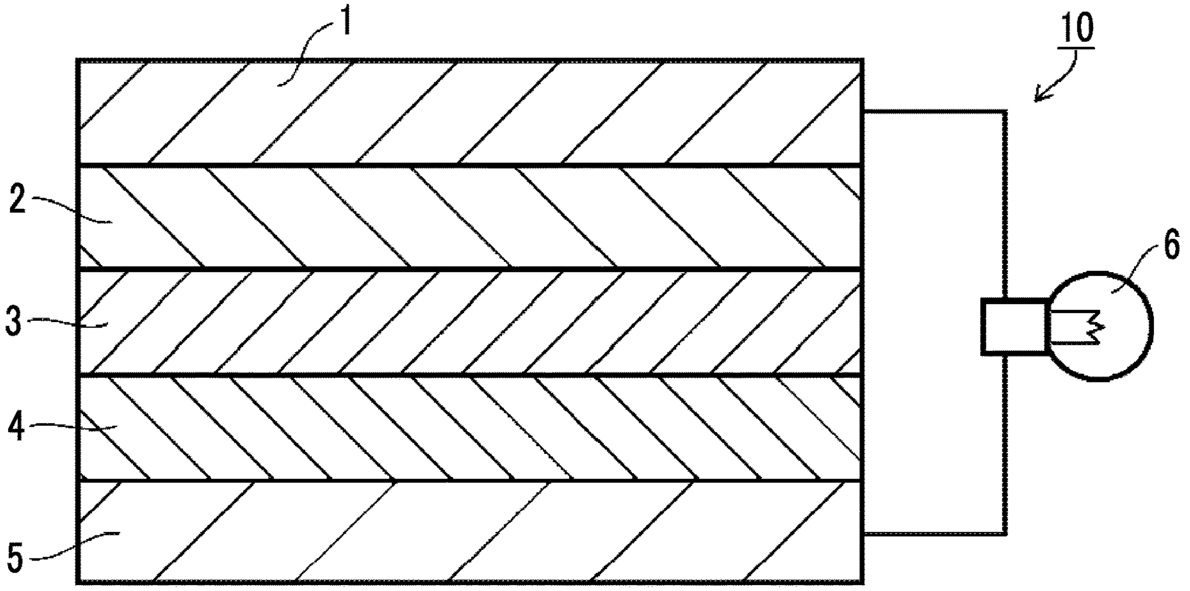
FIG. 1 is a vertical cross-sectional view schematically illustrating an all-solid state secondary battery according to a preferred embodiment of the present invention.
Figure 2:
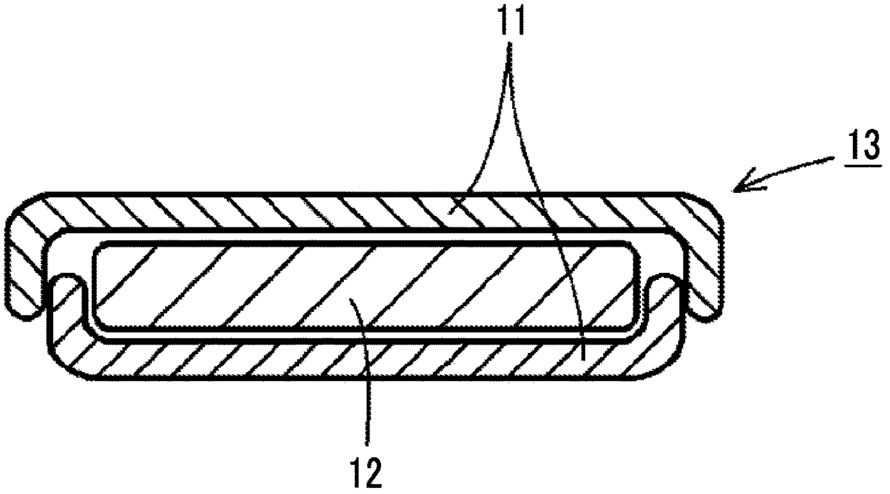
FIG. 2 is a vertical cross-sectional view schematically illustrating an all-solid state secondary battery (coin battery) produced in an example.

A solid electrolyte composition of the present invention includes an inorganic solid electrolyte having a conductivity for ions of metals belonging to Group I or II of the periodic table and a compound having an anionic polymerizable functional group. Hereinafter, a preferred embodiment thereof will be described.

(Inorganic Solid Electrolyte)

The solid electrolyte composition of the present invention contains an inorganic solid electrolyte.

A "solid electrolyte" of the inorganic solid electrolyte refers to a solid-form electrolyte capable of migrating ions therein. The solid electrolyte is clearly differentiated from organic solid electrolytes (polymer electrolytes represented by polyethylene oxide (PEO) or the like and organic electrolyte salts represented by lithium bis(trifluoromethanesulfonyl) imide (LiTFSI)) since the solid electrolyte does not include any organic substances as a principal ion-conductive material. In addition, the inorganic solid electrolyte is a solid in a static state and is thus not disassociated or liberated into cations and anions. Due to this fact, the inorganic solid electrolyte is also clearly differentiated from inorganic electrolyte salts which are disassociated or liberated into cations and anions in electrolytic solutions or polymers ($LiPF_6$, $LiBF_4$, lithium bis(fluorosulfonyl) imide (LiFSI), LiCl, and the like). The inorganic solid electrolyte is not particularly limited as long as the inorganic solid electrolyte has conductivity for ions of metal elements belonging to Group I or II of the periodic table and is generally a substance not having electron conductivity. In a case in which the all-solid state secondary battery of the present invention is a lithium ion battery, the inorganic solid electrolyte preferably has ion conductivity for lithium ions.

As the inorganic solid electrolyte, it is possible to appropriately select and use solid electrolyte materials that are generally used in all-solid state secondary batteries. Typical examples of the inorganic solid electrolyte include (i) sulfide-based inorganic solid electrolytes and (ii) oxide-based inorganic solid electrolytes.

In the present invention, the sulfide-based inorganic solid electrolytes are preferably used since the sulfide-based inorganic solid electrolytes are capable of forming a more favorable interface between an active material and the inorganic solid electrolyte and act as a favorable anionic polymerization initiator on compounds having an anionic polymerizable functional group.

(i) Sulfide-Based Inorganic Solid Electrolytes

The sulfide-based inorganic solid electrolyte preferably contains a sulfur atom (S), has an ion conductivity of a metal element belonging to Group I or II of the periodic table, and has an electron-insulating property. The sulfide-based inorganic solid electrolyte preferably contains at least Li, S, and P as elements and has a lithium ion conductivity, but may include an element other than Li, S, and P depending on the purpose or case.

Examples thereof include lithium ion-conductive inorganic solid electrolytes satisfying a composition represented by Formula (1), which are preferred.

$$L_{a1}M_{b1}P_{c1}S_{d1}A_{e1} \quad (1)$$

In the formula, L represents an element selected from Li, Na, and K and is preferably Li.

M represents an element selected from B, Zn, Sn, Si, Cu, Ga, Sb, Al, and Ge. Among these, B, Sn, Si, Al, or Ge is preferred, and Sn, Al, or Ge is more preferred.

A represents I, Br, Cl, and F and is preferably I or Br and particularly preferably I.

As L, M, and A, it is possible to use one or more elements described above respectively.

a1 to e1 represent the compositional fractions of the respective elements, and a1:b1:c1:d1:e1 satisfies 1 to 12:0 to 1:1:2 to 12:0 to 5. Furthermore, a1 is preferably 1 to 9 and more preferably 1.5 to 4. b1 is preferably 0 to 0.5. Furthermore, d1 is preferably 3 to 7 and more preferably 3.25 to 4.5. Furthermore, e1 is preferably 0 to 3 and more preferably 0 to 1.

In Formula (1), regarding the compositional fractions of L, M, P, S, and A, it is preferable that b1 and e1 are 0, it is more preferable that b1=0, e1=0, and the fractions of a1, c1, and d1 are a1:c1:d1=1 to 9:1:3 to 7, and it is still more preferable that b1=0, e1=0, and a1:c1:d1=1.5 to 4:1:3.25 to 4.5. The compositional fractions of the respective elements can be controlled by adjusting the amounts of raw material compounds blended to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured from a reaction between [1] lithium sulfide ($Li_2S$) and phosphorus sulfide (for example, diphosphorus pentasulfide ($P_2S_5$)), [2] lithium sulfide and at least one of a phosphorus single body or a sulfur single body, or [3] lithium sulfide, phosphorus sulfide (for example, diphosphorus pentasulfide ($P_2S_5$)), and at least one of a phosphorus single body or a sulfur single body.

The ratio between $Li_2S$ and $P_2S_5$ in the Li—P—S-based glass and the Li—P—S-based glass ceramic is preferably 65:35 to 85:15 and more preferably 68:32 to 77:23 in terms of the molar ratio between $Li_2S$:$P_2S_5$. In a case in which the ratio between $Li_2S$ and $P_2S_5$ is set in the above-described range, it is possible to further increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

Examples of the specific compounds of the sulfide-based inorganic solid electrolyte include compounds obtained using a raw material composition containing $Li_2S$ and a sulfide of an element belonging to Groups XIII to XV. More specific examples thereof include $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Among these, $Li_2S$—$P_2S_5$, $Li_2S$—$GeS_2$—$Ga_2S_3$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—LiI—$Li_2O$—$P_2S_5$, $Li_2S$—$Li_2O$—$P_2S_5$, $Li_2S$—$Li_3PO_4$—$P_2S_5$, and/or crystal, amorphous, or crystal and amorphous-mixed raw material compositions made of $Li_2S$—$GeS_2$—$P_2S_5$ or $Li_{10}GeP_2S_{12}$ are preferred due to their high lithium ion conductivity. Examples of a method for synthesizing a sulfide-based inorganic solid electrolyte material using the above-described raw material composition include an amorphorization method. Examples of the amorphorization method include a mechanical milling method, and a melting quenching method. Among these, the mechanical milling method is preferred. This is because treatments at a normal temperature become possible, and it is possible to simplify manufacturing steps.

Among these, $Li_2S$—$P_2S_5$, LGPS ($Li_{10}GeP_2S_{12}$), $Li_2S$—$P_2S_5$—$SiS_2$, and the like are preferred.

(ii) Oxide-Based Inorganic Solid Electrolytes

Oxide-based inorganic solid electrolytes are preferably solid electrolytes which contain oxygen atoms (O), have an ion conductivity for metal elements belonging to Group I or II of the periodic table, and have electron-insulating properties.

The ion conductivity for the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit is not particularly limited, but is realistically $1\times10^{-1}$ S/cm or less.

Specific examples of the compounds include $Li_{xa}La_{ya}TiO_3$ [xa satisfies 0.3≤xa≤0.7 and ya satisfies 0.3≤ya≤0.7] (LLT); $Li_{xb}La_{yb}Zr_{zb}M_{mb}^{bb}O_{nb}$ ($M^{bb}$ is at least one element selected from Al, Mg, Ca, Sr, V, Nb, Ta, Ti, Ge, In and Sn, xb satisfies 5≤xb≤10, yb satisfies 1≤yb≤4, zb satisfies 1≤zb≤4, mb satisfies 0≤mb≤2, and nb satisfies 5≤nb≤20); $Li_{xc}B_{yc}M_{zc}^{cc}O_{nc}$ ($M^{cc}$ is at least one element selected from C, S, Al, Si, Ga, Ge, In, and Sn, xc satisfies 0≤xc≤5, yc satisfies 0≤yc≤1, zc satisfies 0≤zc≤1, and nc satisfies 0≤nc≤6); $Li_{xd}(Al, Ga)_{yd}(Ti, Ge)_{zd}Si_{ad}P_{md}O_{nd}$ (xd satisfies 1≤xd≤3, yd satisfies 0≤yd≤1, zd satisfies 0≤zd≤2, ad satisfies 0≤ad≤1, md satisfies 1≤md≤7, and nd satisfies 3≤nd≤13); $Li_{(3-2xe)}M_{xe}^{ee}D^{ee}O$ (xe represents a number of 0 or more and 0.1 or less, and $M^{ee}$ represents a divalent metal atom. $D^{ee}$ represents a halogen atom or a combination of two or more halogen atoms.); $Li_{xf}Si_{yf}O_{zf}$ (xf satisfies 1≤xf≤5, yf satisfies 0≤yf≤3, and zf satisfies 1≤zf≤10), $Li_{xg}S_{yg}O_{zg}$ (xg satisfies 1≤xg≤3, yg satisfies 0≤yg≤2, and zg satisfies 1≤zg≤10); $Li_3BO_3$; $Li_3BO_3$—$Li_2SO_4$; $Li_2O$—$B_2O_3$—$P_2O_5$; $Li_2O$—$SiO_2$; $Li_6BaLa_2Ta_2O_{12}$; $Li_3PO_{(4-3/2w)}N_w$ (w satisfies w<1); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al, Ga)_{xh}(Ti, Ge)_{2-xh}Si_{yh}P_{3-yh}O_{12}$ (xh satisfies 0≤xh≤1 and yh satisfies 0≤yh≤1); $Li_7La_3Zr_2O_{12}$ (LLZ) having a garnet-type crystal structure.

In addition, phosphorus compounds containing Li, P, and O are also desirable. Examples thereof include lithium phosphate ($Li_3PO_4$); LiPON in which some of oxygen atoms in lithium phosphate are substituted with nitrogen, $LiPOD^1$ ($D^1$ is preferably one or more elements selected from Ti, V, Cr, Mn, Fe, Co, Ni, Cu, Zr, Nb, Mo, Ru, Ag, Ta, W, Pt, and Au); and the like.

Furthermore, it is also possible to preferably use $LiA^1ON$ ($A^1$ is one or more elements selected from Si, B, Ge, Al, C, and Ga) and the like.

Among these, LLT, $Li_{xb}La_{yb}Zr_{zb}M_{mb}^{bb}O_{nb}$ ($M^{bb}$, xb, yb, zb, mb, and nb are as described above), LLZ, $Li_3BO_3$; $Li_3BO_3$—$Li_2SO_4$, and $Li_{xd}(Al, Ga)_{yd}(Ti, Ge)_{zd}Si_{ad}P_{md}O_{nd}$ (xd, yd, zd, ad, md, and nd are as described above) are preferred, and LLZ, LLT, LAGP ($Li_{1.5}Al_{0.5}Ge_{1.5}(PO_4)_3$), and LATP ($[Li_{1.4}Ti_2Si_{0.4}P_{2.6}O_{12}]$—$AlPO_4$) are more preferred.

The inorganic solid electrolyte is preferably particles. The volume-average particle diameter of the particulate inorganic solid electrolyte is not particularly limited, but is preferably 0.01 μm or more and more preferably 0.1 μm or more. The upper limit is preferably 100 μm or less and more preferably 50 μm or less. Meanwhile, the volume-average particle diameter of the inorganic solid electrolyte is measured in the following order. One percent by mass of a dispersion liquid is diluted and prepared using the inorganic solid electrolyte particles and water (heptane in a case in which the inorganic solid electrolyte is unstable in water) in a 20 mL sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., thereby obtaining the volume-average particle diameter. Regarding other detailed conditions and the like, the description of JIS Z8828:2013 “Particle size analysis-Dynamic light scattering method” is referred to as necessary. Five specimens are produced and measured per level, and the average values thereof are employed.

In a case in which the satisfaction of both the reduction of the interface resistance and the battery characteristic-maintaining effect (the improvement of the cycle characteristics) is taken into account, the content of the inorganic solid electrolyte in the solid electrolyte composition is preferably 5% by mass or more, more preferably 70% by mass or more, and particularly preferably 90% by mass or more with respect to 100% by mass of the solid content. From the same viewpoint, the upper limit is preferably 99.9% by mass or less, more preferably 99.5% by mass or less, and particularly preferably 99% by mass or less.

In addition, the content of the inorganic solid electrolyte in the solid electrolyte composition is preferably 1% by mass or more, more preferably 5% by mass or more, and still more preferably 10% by mass or more. The upper limit is preferably 80% by mass or less, more preferably 70% by mass or less, and still more preferably 60% by mass or less.

However, in the case of containing a positive electrode active material or a negative electrode active material, the content of the inorganic solid electrolyte in the solid electrolyte composition is preferably a content at which the total content of the positive electrode active material or the negative electrode active material and the inorganic solid electrolyte is in the above-described range.

Meanwhile, the solid content in the present specification refers to a component that does not disappear due to volatilization or evaporation in the case of being dried at 170° C. for six hours in a nitrogen atmosphere. Typically, the solid content indicates components other than a dispersion medium described below.

The inorganic solid electrolyte may be used singly or two or more inorganic solid electrolytes may be used in combination.

(Compound Having Anionic Polymerizable Functional Group)

The solid electrolyte composition of the present invention contains a compound having an anionic polymerizable functional group.

The expression “anionic polymerizable” refers to a property with which monomer units continuously form a bond through an addition reaction by an anion using the anion as a polymerization initiating species.

It is known that, generally, the radical polymerizable property, anionic polymerizable property, and cationic polymerizable property of a vinyl monomer are determined by the effects of the resonance stabilization and polarity of a substituent that is bonded to a vinyl group. A Q-e scheme quantifies the above-described fact using an experimental parameter. Q represents the conjugation effect (the degree of resonance stabilization) of a monomer, and e represents the polarity effect of a monomer. According to the Q-e scheme, monomers having a Q value of 2.0 or more and an e value of 0.8 or more easily develop the anionic polymerizable property. Particularly, monomers having a Q value of 4.0 or more and an e value of 0.9 or more develop the anionic polymerizable property more easily. The realistic upper limits are 15 or less for the Q value and 4.0 or less for the e value.

The compound having an anionic polymerizable functional group which is used in the present invention is preferably a vinyl monomer having the above-described preferred Q value and e value or a compound having a vinyl monomer having the above-described preferred Q value and e value as a substituent.

Specifically, the compound having an anionic polymerizable functional group which is used in the present invention more preferably satisfies the following condition 1 or 2 and is still more preferably represented by General Formula (1a) or (1b). In a case in which the compound has the above-described structure, the counter anion of a metal cation in the inorganic solid electrolyte is easily added to a double bond in the anionic polymerizable functional group, then, the compound grows through anionic polymerization, and a polymer or a crosslinking structure is formed. As a result of the above-described reaction, the anionic polymerizable functional group that is used in the present invention directly forms a covalent bond with the inorganic solid electrolyte, and thus all-solid state secondary batteries produced using the solid electrolyte composition of the present invention exhibit an excellent bonding property and excellent cycle characteristics.

1) Compound having anionic polymerizable functional group which satisfies the following condition 1 or 2

(Condition 1): A compound having an anionic polymerizable functional group which is represented by General Formula (1A)

(Condition 2): A compound having a group represented by General Formula (1B) as an anionic polymerizable functional group General Formula (1A)

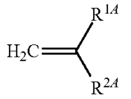

General Formula (1B)

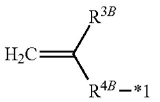

In the formula, $R^{1A}$ and $R^{2A}$ each independently represent a monovalent electron-withdrawing group, $R^{3B}$ represents a monovalent electron-withdrawing group or $—R^{4B}—*_1$, and $R^{4B}$ represents a divalent electron-withdrawing group in which a bonding portion with a carbon atom to which $R^{3B}$ and $R^{4B}$ bond withdraws electrons. $*_1$ represents a bonding site as the anionic polymerizable functional group.

$R^{1A}$, $R^{2A}$, $R^{3B}$ and $R^{4B}$ may link together to form a ring.

The compound having an anionic polymerizable functional group which satisfies the following condition 2 may have the group represented by General Formula (1B) anywhere in the compound.

Examples of such an aspect include monofunctional compounds having one or more groups represented by General Formula (1B) in the compound and polyfunctional compounds having two or more groups represented by General Formula (1B) in the compound. In addition, examples of another aspect include polymers having the group represented by General Formula (1B) in the polymer main chain and/or a side chain. From the viewpoint of the synthesis, polymers having the group represented by General Formula (1B) in a polymer side chain are preferably exemplified. Here, the polymer may have any structure as long as the polymer exhibits the effects of the present invention and may be, for example, any of random, alternate, block, and graft-type copolymers. In addition, the polymer chain is not limited to a carbon-carbon bond and may have an amide bond, an ester bond, a urethane bond, a urea bond, or the like.

Hereinafter, the monovalent electron-withdrawing groups as $R^{1A}$, $R^{2A}$, and $R^{3B}$ and the divalent electron-withdrawing group as $R^{4B}$ will be described in detail.

i) Monovalent Electron-Withdrawing Group

The monovalent electron-withdrawing groups as $R^{1A}$, $R^{2A}$, and $R^{3B}$ each are independently preferably any one of a nitro group, a cyano group, $—C(=O)OR^5$, $—C(=O)R^6$, an alkyl group substituted with a fluoro group, and an aryl group substituted with at least any one of a nitro group, a cyano group, $—C(=O)OR^5$, $—C(=O)R^6$, or a fluoro group from the viewpoint of satisfying both the stability during the handling of the solid electrolyte composition and the curing property during the application of the solid electrolyte composition. Here, $R^5$ and $R^6$ each independently represent a hydrogen atom, an alkyl group, or an aryl group.

As the substituent in the monovalent electron-withdrawing group and $R^5$ and $R^6$, it is possible to preferably apply the description of a substituent P described below. The more preferred number of carbon atoms and the like of the substituent in the monovalent electron-withdrawing group and $R^5$ and $R^6$ will be described below.

In the alkyl group substituted with a fluoro group, the number of the substituents (fluoro groups) is not particularly limited, but is preferably one or more and equal to or smaller than the number of hydrogen atoms in the alkyl group that is yet to be substituted, more preferably 1 to 5, and still more preferably 1 to 3. The number of carbon atoms constituting the alkyl group is preferably 1 to 16, more preferably 1 to 12, still more preferably 1 to 8, particularly preferably 1 to 6, and most preferably 1 to 3. The alkyl group substituted with a fluoro group as $R^1$ to $R^3$ is preferably a perfluoroalkyl group.

Specific examples thereof include fluoromethyl, difluoromethyl, trifluoromethyl, 2-fluoroethyl, 1,1-difluoroethyl, 1,2-difluoroethyl, and pentafluoroethyl.

In the aryl group substituted with at least any one of a nitro group, a cyano group, $—C(=O)OR^5$, $—C(=O)R^6$, or a fluoro group, the number of the substituents is not particularly limited, but is preferably one or more and equal to or smaller than the number of hydrogen atoms in the aryl group that is yet to be substituted and more preferably 1 to 5. The number of carbon atoms constituting the aryl group is preferably 6 to 18, more preferably 6 to 14, and particularly preferably 6 to 12. The substituent position numbers in a phenyl group are preferably the second position, the fourth position, and/or the sixth position and more preferably the fourth position. Among them, the aryl group substituted with at least any one of a nitro group, a cyano group, or a fluoro group is preferred, and a phenyl group substituted with at least any one of a nitro group, a cyano group, or a fluoro group is preferred.

Specific examples thereof include 2-nitrophenyl, 2-cyanophenyl, 2-fluorophenyl, 4-nitrophenyl, 4-cyanophenyl, 4-fluorophenyl, 2,4-difluorophenyl, 2,4-dinitrophenyl, 2,4-dicyanophenyl, 2,4,6-trifluorophenyl, and 1-fluoro-2-naphthyl.

Examples of the alkyl group as $R^5$ and $R^6$ include alkyl groups (preferably having 1 to 20 carbon atoms, more preferably having 1 to 16 carbon atoms, still more preferably having 1 to 8 carbon atoms, particularly preferably having 1 to 6 carbon atoms, and most preferably having 1 to 3 carbon atoms), cycloalkyl groups (preferably having 3 to 20 carbon atoms), and aralkyl groups (preferably having 7 to 23 carbon atoms). Specific examples thereof include methyl, ethyl, n-propyl, isopropyl, n-butyl, t-butyl, n-octyl, dodecyl, heptadecyl, cyclohexyl, isobornyl, and benzyl. The alkyl group may be any one of an unsubstituted alkyl group and a substituted alkyl group.

The aryl group preferably has 6 to 18 carbon atoms, more preferably 6 to 14 carbon atoms, and particularly preferably has 6 to 12 carbon atoms. Specific examples thereof include phenyl, tolyl, and naphthyl. The aryl group may be any one of an unsubstituted aryl group and a substituted aryl group, and, as the substituted aryl group, an aryl group substituted with the above-described fluoro group is preferably exemplified.

$R^5$ and $R^6$ each are independently a hydrogen atom, an alkyl group, or an aryl group and preferably a hydrogen atom or an alkyl group.

$R^5$ and $R^6$ are more preferably an alkyl group and particularly preferably an alkyl group substituted with at least one kind of functional group selected from the following group of functional groups I.

<Group of Functional Groups I>

A hydroxy group, a mercapto group, a carboxy group, a sulfonic acid group, a phosphoric acid group, an amino group, a cyano group, an isocyanate group, an acid anhydride group, an epoxy group, an oxetanyl group, an alkoxy group, a carbonyl group, groups having a ring structure of three or more rings, an amide bond, a urea bond, a urethane bond, an imide bond, and an isocyanurate bond Here, the functional group refers to both a functional group such as a hydroxy group and a bond such as an amide bond.

In addition, the acid anhydride group refers to a group obtained from an acid anhydride of a dicarboxylic acid (a group having at least one hydrogen atom substituted with a bonding site "—").

The amino group preferably has 0 to 12 carbon atoms, more preferably has 0 to 6 carbon atoms, and particularly preferably has 0 to 2 carbon atoms.

The sulfonic acid group may be an ester or salt thereof. In the case of the ester, the number of carbon atoms is preferably 1 to 24, more preferably 1 to 12, and particularly preferably 1 to 6.

The phosphoric acid group may be an ester or salt thereof. In the case of the ester, the number of carbon atoms is preferably 1 to 24, more preferably 1 to 12, and particularly preferably 1 to 6.

Regarding other functional groups, it is possible to apply the preferred description of the substituent P described below.

Meanwhile, the functional group may be present as a substituent or a linking group. For example, the amino group may be present as a divalent imino group or a trivalent nitrogen atom.

The group having a ring structure of three or more rings is preferably a group having a cholesterol ring structure or a group having a structure in which three or more aromatic groups are condensed together and more preferably a cholesterol residue or a pyrenyl group.

The functional group selected from the above-described group of functional groups is preferably any one of a hydroxy group, a carboxy group, a sulfonic acid group, a phosphoric acid group, a cyano group, an alkoxy group, and a group having a ring structure of three or more rings and more preferably any one of a carboxy group, a sulfonic acid group, a phosphoric acid group, and a group having a ring structure of three or more rings.

ii) Divalent Electron-Withdrawing Group

The divalent electron-withdrawing group as $R^{4B}$ is preferably any one of an alkylene group substituted with *—C(═O)OR$^7$—, *—C(═O)R$^8$—, or a fluoro group and an arylene group substituted with at least any one of a nitro group, a cyano group, —C(═O)OR$^5$, —C(═O)R$^6$, or a fluoro group. Here, $R^5$ and $R^6$ are identical to $R^5$ and $R^6$ in the above-described monovalent electron-withdrawing group, and $R^7$ and $R^8$ each independently represent a single bond, an alkylene group, or an arylene group. * represents the bonding portion with the carbon atom to which $R^{3B}$ and $R^{4B}$ bond.

As the divalent electron-withdrawing group as $R^{4B}$, it is possible to preferably apply the description of the divalent group in which at least one hydrogen atom in the substituent P described below is substituted with a bonding site "—" and the bonding portion with the carbon atom to which $R^{3B}$ and $R^{4B}$ bond withdraws electrons. The more preferred number of carbon atoms and the like of the divalent electron-withdrawing group as $R^{4B}$ will be described below.

In the alkylene group substituted with a fluoro group, the number of the substituents (fluoro groups) is not particularly limited, but is preferably one or more and equal to or smaller than the number of hydrogen atoms in the alkylene group that is yet to be substituted, more preferably 1 to 4, and still more preferably 1 or 2. The number of carbon atoms constituting the alkylene group is preferably 1 to 16, more preferably 1 to 12, still more preferably 1 to 8, particularly preferably 1 to 6, and most preferably 1 to 3. The alkylene group substituted with a fluoro group as $R^{4B}$ is preferably a perfluoroalkylene group.

Specific examples thereof include fluoromethylene, difluoromethylene, fluoroethylene, 1,1-difluoroethylene, 1,2-difluoroethylene, and tetrafluoroethylene.

In the arylene group substituted with at least any one of a nitro group, a cyano group, —C(═O)OR$^5$, —C(═O)R$^6$, or a fluoro group, the number of the substituents is not particularly limited, but is preferably one or more and equal to or smaller than the number of hydrogen atoms in the arylene group that is yet to be substituted and more preferably 1 to 4. The number of carbon atoms constituting the arylene group is preferably 6 to 18, more preferably 6 to 14, and particularly preferably 6 to 12. Regarding the substituent position numbers, in a case in which the number of an isolated atomic value carbon that bonds to the carbon atom to which $R^{3B}$ and $R^{4B}$ bond in a phenylene group is defined as one, the phenylene group preferably has a substituent in at least any one of the second position, the fourth position, and the sixth position and more preferably has a substituent in at least any one of the second position and the fourth position. Among them, the arylene group substituted with at least any one of a nitro group, a cyano group, or a fluoro group is preferred, and a phenylene group substituted with at least any one of a nitro group, a cyano group, or a fluoro group is preferred.

Specific examples thereof include 2-nitro-1,3 (or 1,4)-phenylene, 2-cyano-1,3 (or 1,4)-phenylene, 2-fluoro-1,3 (or 1,4)-phenylene, 4-nitro-1,3 (or 1,2)-phenylene, 4-cyano-1,3 (or 1,2)-phenylene, 4-fluoro-1,3 (or 1,2)-phenylene, 2,3-difluoro-1,4-phenylene, 2,3-dinitro-1,4-phenylene, 2,3-dicyano-1,4-phenylene, and 1-fluoro-naphthalene-2,6-diyl.

The alkylene group as $R^7$ and $R^8$ preferably has 1 to 16 carbon atoms, more preferably has 1 to 12 carbon atoms, still more preferably has 1 to 8 carbon atoms, particularly preferably has 1 to 6 carbon atoms, and most preferably has 1 to 3 carbon atoms. Specific examples thereof include methylene, ethylene, n-propylene, isopropylene, n-butylene, t-butylene, and n-octylene. The alkylene group may be any one of an unsubstituted alkylene group and a substituted alkylene group, and, as the substituted alkylene group, an alkylene group substituted with the above-described fluoro group is preferably exemplified.

The arylene group preferably has 6 to 18 carbon atoms, more preferably has 6 to 14 carbon atoms, and particularly preferably has 6 to 12 carbon atoms. Specific examples thereof include phenylene, tolylene, and naphthalenediyl. The arylene group may be any one of an unsubstituted arylene group and a substituted arylene group, and, as the substituted arylene group, an arylene group substituted with the above-described fluoro group is preferably exemplified.

$R^7$ is a single bond, an alkylene group, or an arylene group and preferably a single bond or an alkylene group.

$R^8$ is preferably a single bond or an alkylene group.

A particularly preferred combination of $R^{1A}$ and $R^{2A}$ is any one of a cyano group, a trifluoromethyl group, and —C(═O)OR$^5$ as $R^{1A}$ and —C(═O)OR$^5$ as $R^{2A}$.

In addition, $R^{3B}$ is preferably a monovalent electron-withdrawing group, and a particularly preferred combination of $R^{3B}$ and $R^{4B}$ is any one of a cyano group, a trifluoromethyl group, and —C(═O)OR$^5$ as $R^{3B}$ and —C(═O)OR$^7$ as $R^{4B}$.

The compound having an anionic polymerizable functional group which has the above-described combination of substituents is capable of satisfying both the stability during the handling of the solid electrolyte composition and the curing property during the application of the solid electrolyte composition.

2) Compound Having Anionic Polymerizable Functional Group Represented by General Formula (1a) or (1b)

General Formula (1a)

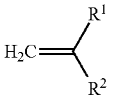

General Formula (1b)

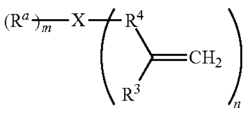

In the formula, $R^1$ to $R^3$ each independently represent a monovalent electron-withdrawing group, $R^4$ represents a divalent electron-withdrawing group in which a bonding portion with a carbon atom to which $R^3$ and $R^4$ bond withdraws electrons, and $R^a$ represents a hydrogen atom or an organic group. X represents an m+n-valent linking group, m is an integer of 0 to 10, and n is an integer of 2 to 10. $R^1$, $R^2$, $R^3$ and $R^4$ may link together to form a ring.

The monovalent electron-withdrawing group as $R^1$ to $R^3$ and the divalent electron-withdrawing group as $R^4$ are identical to the monovalent electron-withdrawing group and the divalent electron-withdrawing group in General Formula (1A) or (1B).

Examples of the organic group as $R^a$ include an alkyl group, an aryl group, —C(═O)OR$^b$, and —C(═O)R$^c$.

$R^a$ is preferably a hydrogen atom, an alkyl group, or —C(═O)R$^c$ and more preferably an alkyl group or —C(═O)R$^c$. $R^b$ and $R^c$ are preferably an alkyl group substituted with at least one kind of functional group selected from the following group of functional groups II.

<Group of Functional Groups II>

A hydroxy group, a mercapto group, a carboxy group, a sulfonic acid group, a phosphoric acid group, an amino group, a cyano group, an isocyanate group, an acid anhydride group, an epoxy group, an oxetanyl group, an alkoxy group, a carbonyl group, groups having a ring structure of three or more rings, an amide bond, a urea bond, a urethane bond, an imide bond, and an isocyanurate bond Regarding the details of the functional groups in the group of functional groups II, it is possible to preferably apply the above-described description of the group of functional groups I.

n is preferably an integer of 2 to 60 and more preferably an integer of 2 to 10.

m is preferably an integer of 0 to 10 and more preferably an integer of 0 to 4.

X is preferably a di- to 60-valent organic group and more preferably a tri- to 12-valent organic group.

Preferred examples of the n+m-valent linking group as X include polycyclic organic groups represented by General Formulae (Q-1) to (Q-19), pentaerythritol residues, dipentaerythritol residues, diaminoalkylene residues, trimethylolalkane residues, and the like represented by General Formulae (Q-20) to (Q-38), cyclic siloxane residues represented by General Formulae (H-1) to (H-3), silsesquioxane residues represented by General Formulae (P-1) to (P-8), and the like.

Meanwhile, Y in General Formulae (Q-1) to (Q-38) and R in General Formulae (H-1) to (H-3) and (P-1) to (P-8) are random linking groups and represent a bonding portion with $R^4$ or $R^a$.

Examples of the random linking groups include a single bond, an alkylene group (preferably having 1 to 18 carbon atoms and more preferably having 1 to 10 carbon atoms), —O—, —C(═O)—, —C(═O)O—, and —S—, and a single bond, an alkylene group, or —O— is preferred.

In the following general formulae, a to f represent the number of times of repetition and each are independently preferably 2 to 20 and more preferably 3 to 10.

(Q-1)

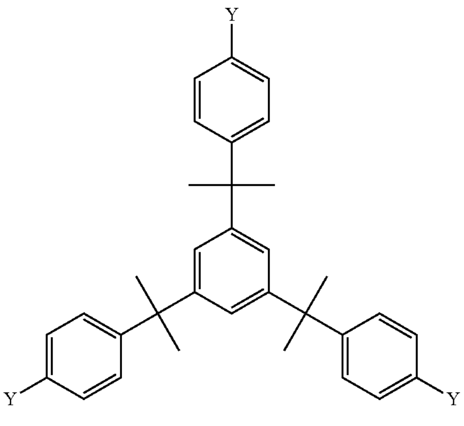

(Q-2)

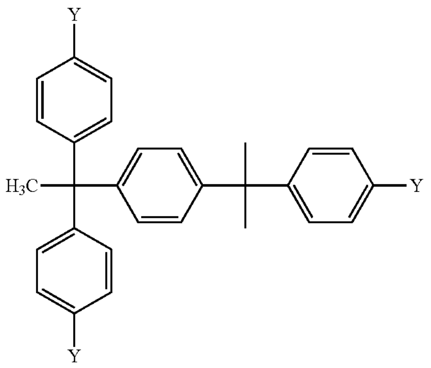

-continued
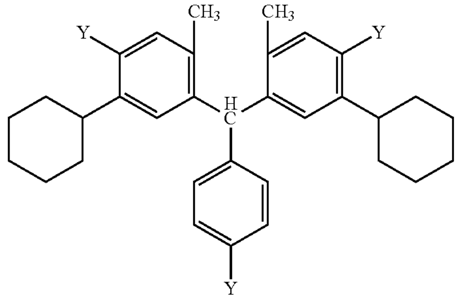
(Q-3)
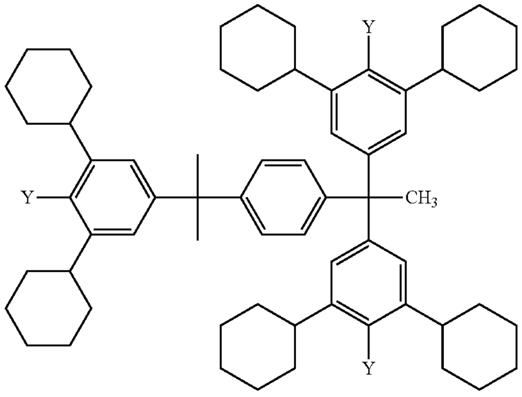
(Q-4)
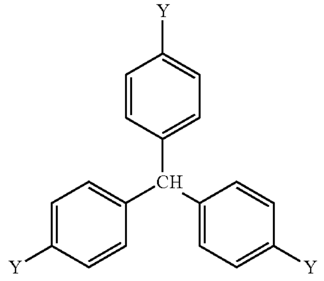
(Q-5)
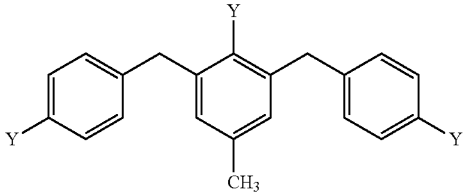
(Q-6)
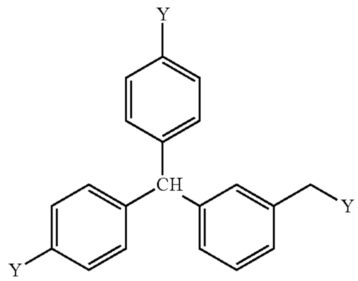
(Q-7)
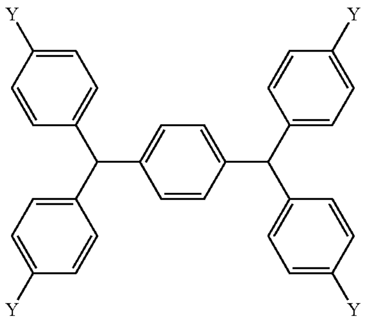
(Q-8)
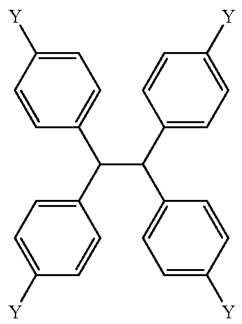
(Q-9)
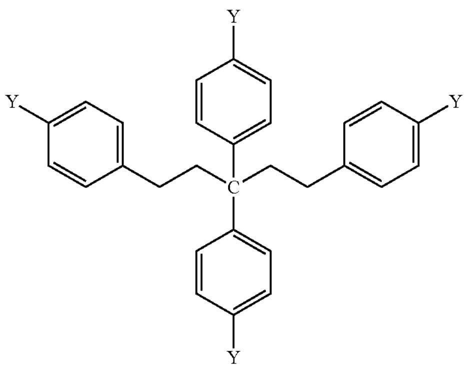
(Q-10)

-continued
(Q-11)
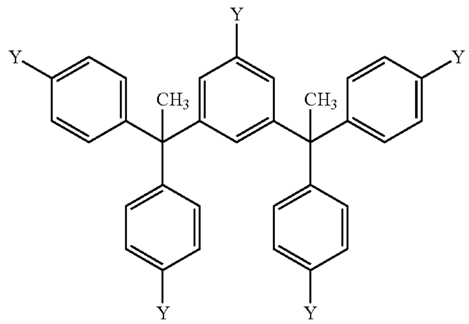
(Q-12)
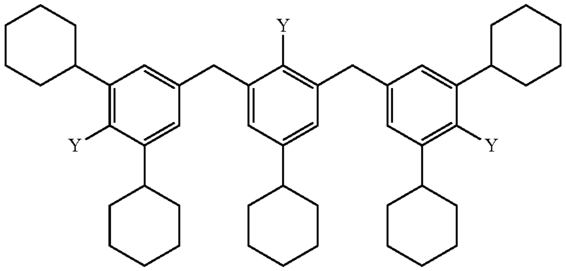
(Q-13)
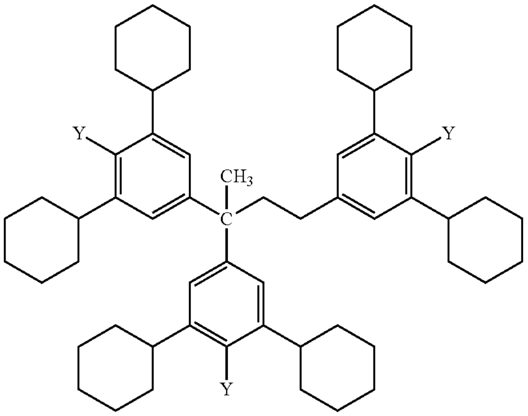
(Q-14)
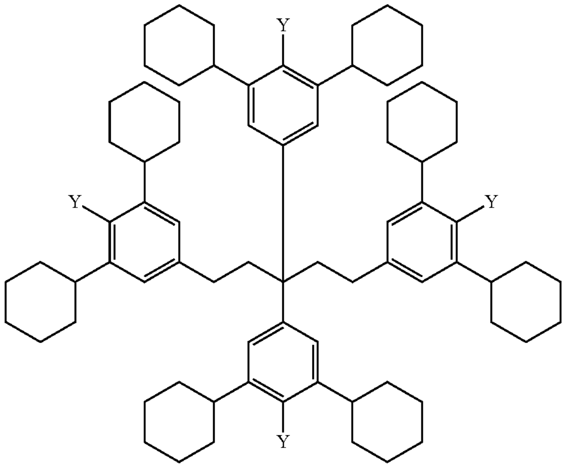
(Q-15)
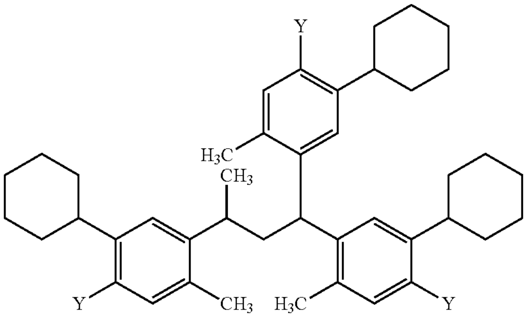
(Q-16)
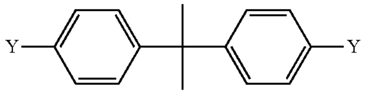
(Q-17)
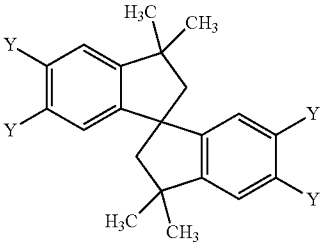
(Q-18)
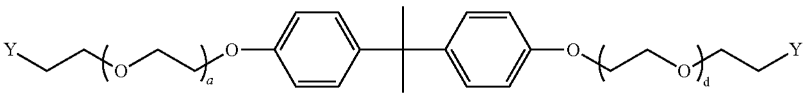

-continued
(Q-19)
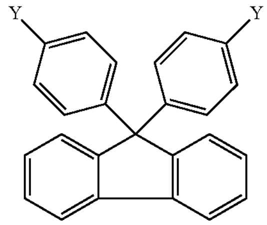
(Q-20)
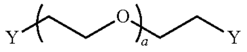
(Q-21)
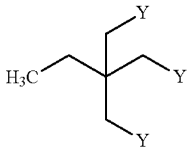
(Q-22)
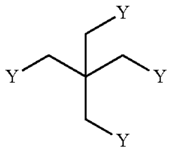
(Q-23)
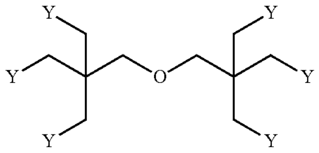
(Q-24)
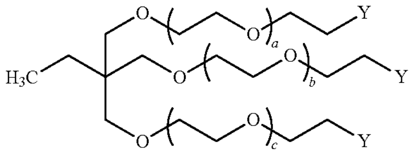
(Q-25)
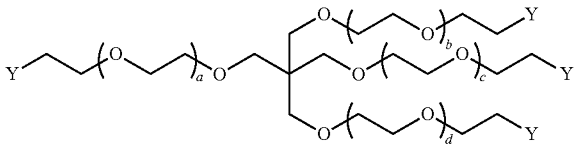
(Q-26)
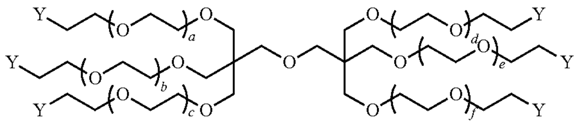
(Q-27)
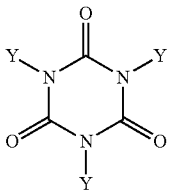
(Q-28)
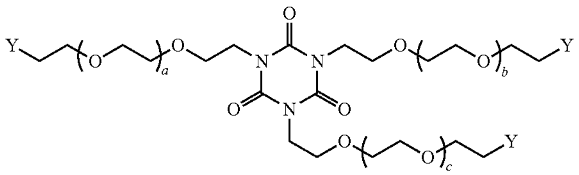
(Q-29)
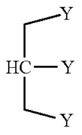
(Q-30)
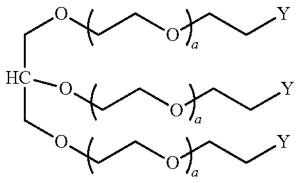
(Q-31)
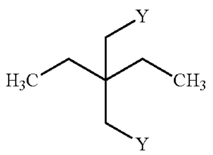
(Q-32)
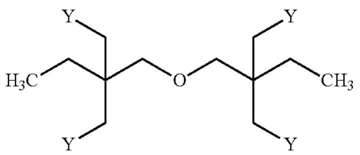
(Q-33)
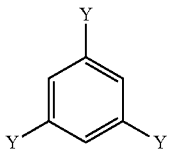
(Q-34)
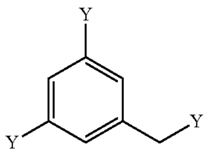

-continued
(Q-35)
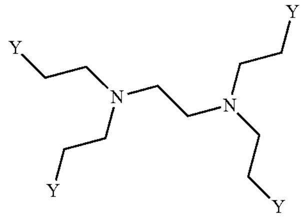
(Q-36)
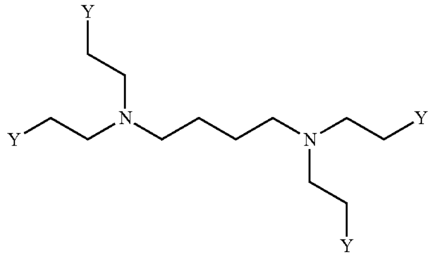
(Q-37)
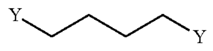
(Q-38)
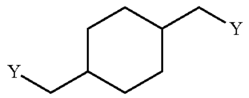
Formula (H-1)
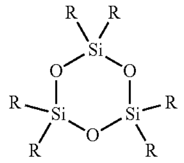
Formula (H-2)
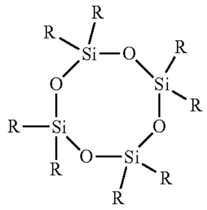
Formula (H-3)
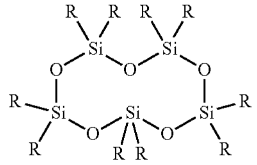
Formula (P-1)
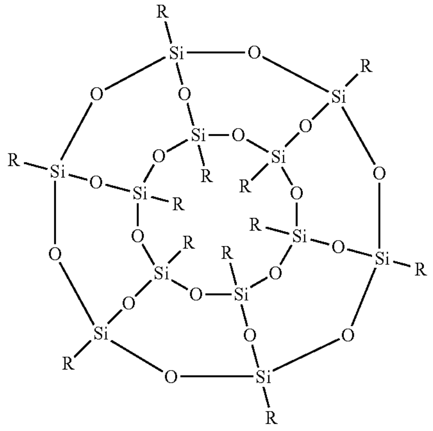
Formula (P-2)
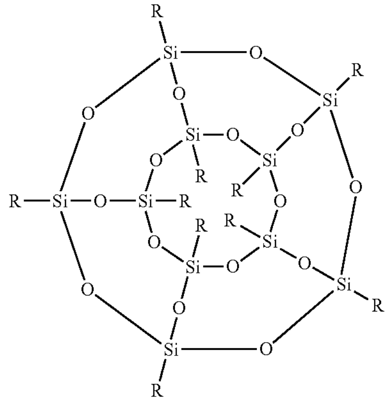
Formula (P-3)
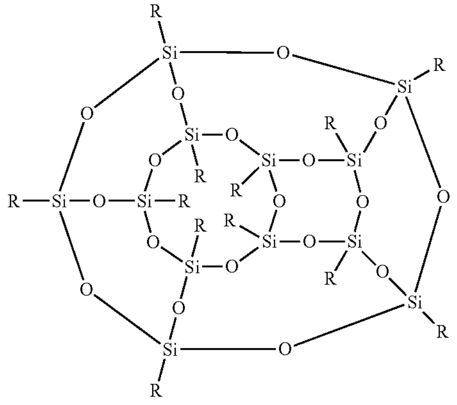

-continued

Formula (P-4)

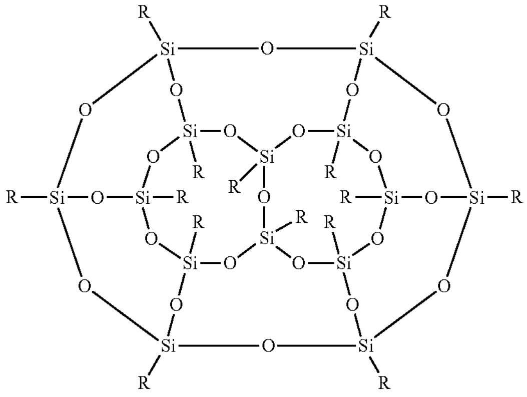

Formula (P-5)

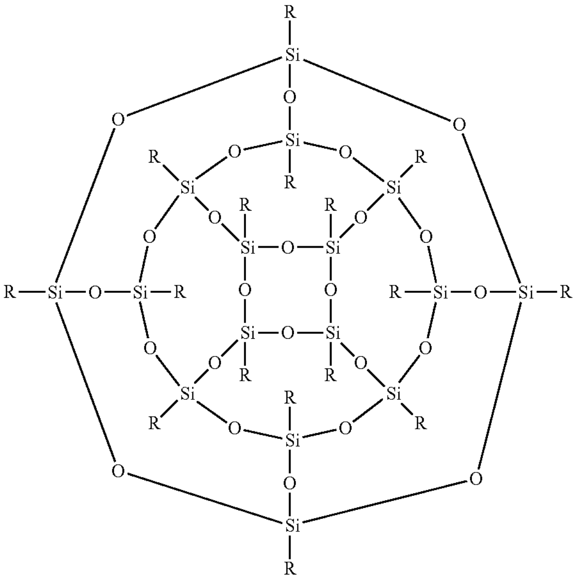

Formula (P-6)

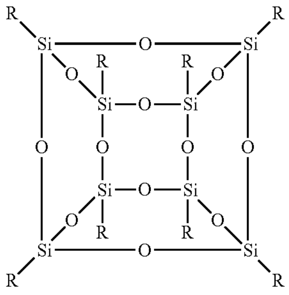

Formula (P-7)

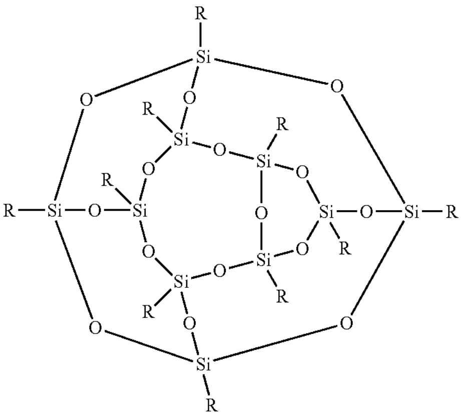

Formula (P-8)

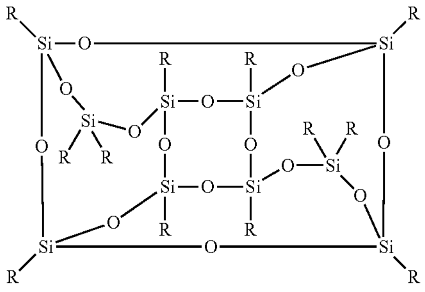

Specific examples of the compound having an anionic polymerizable functional group which satisfies the condition 1 include 2-methylene malononitrile, $H_2C{=}C(COOR^5)_2$ (2-methylenemalonic acid, dimethyl 2-methylenemalonate, diethyl 2-methylenemalonate, diisopropyl 2-methylenemalonate, butyl 2-methylenemalonate, t-butyl 2-methylenemalonate, cyclohexyl 2-methylenemalonate, and the like), $H_2C{=}C(CN)(COOR^5)$ (2-cyanoacrylic acid, methyl 2-cyanoacrylate, ethyl 2-cyanoacrylate, propyl 2-cyanoacrylate, isopropyl 2-cyanoacrylate, butyl 2-cyanoacrylate, benzyl 2-cyanoacrylate, methoxyethyl 2-cyanoacrylate, t-butyl 2-cyanoacrylate, isobornyl 2-cyanoacrylate, cyclohexyl 2-cyanoacrylate, dodecyl 2-cyanoacrylate, stearyl 2-cyanoacrylate, and the like), $H_2C{=}C(CF_3)(COOR^5)$ (2-(trifluoromethyl)acrylic acid, methyl 2-(trifluoromethyl)acrylate, ethyl 2-(trifluoromethyl)acrylate, hydroxyethyl 2-(trifluoromethyl)acrylate, cyanoethyl 2-(trifluoromethyl)acrylate, carboxyethyl 2-(trifluoromethyl)acrylate, pyrenylmethyl 2-(trifluoromethyl)acrylate, cholesteroyl 2-(trifluoromethyl) acrylate, propyl 2-(trifluoromethyl)acrylate, isopropyl 2-(trifluoromethyl)acrylate, butyl 2-(trifluoromethyl)acrylate, benzyl 2-(trifluoromethyl)acrylate, methoxyethyl 2-(trifluoromethyl)acrylate, t-butyl 2-(trifluoromethyl)acrylate, isobornyl 2-(trifluoromethyl)acrylate, cyclohexyl 2-(trifluoromethyl) acrylate, dodecyl 2-(trifluoromethyl)acrylate, stearyl 2-(trifluoromethyl)acrylate, and the like), $H_2C{=}C$ $(C_6H_4NO_2)(COOR^5)$ (2-(4-nitrophenyl)acrylic acid, methyl 2-(4-nitrophenyl)acrylate, ethyl 2-(4-nitrophenyl)acrylate, propyl 2-(4-nitrophenyl)acrylate, isopropyl 2-(4-nitrophenyl)acrylate, butyl 2-(4-nitrophenyl)acrylate, benzyl 2-(4-nitrophenyl)acrylate, methoxyethyl 2-(4-nitrophenyl)acrylate, t-butyl 2-(4-nitrophenyl)acrylate, isobornyl 2-(4-nitrophenyl)acrylate, cyclohexyl 2-(4-nitrophenyl)acrylate, dodecyl 2-(4-nitrophenyl)acrylate, stearyl 2-(4-nitrophenyl) acrylate, carboxyethyl 2-(4-nitrophenyl)acrylate, pyrenylmethyl 2-(4-nitrophenyl)acrylate, cholesteroyl 2-(4-nitrophenyl)acrylate, and the like), and $H_2C{=}C(C_6H_4CN)(COOR^5)$ (2-(4-cyanophenyl)acrylic acid, methyl 2-(4-cyanophenyl) acrylate, ethyl 2-(4-cyanophenyl)acrylate, propyl 2-(4-cyanophenyl)acrylate, isopropyl 2-(4-cyanophenyl)acrylate, butyl 2-(4-cyanophenyl)acrylate, benzyl 2-(4-cyanophenyl) acrylate, methoxyethyl 2-(4-cyanophenyl)acrylate, t-butyl 2-(4-cyanophenyl)acrylate, isobornyl 2-(4-cyanophenyl) acrylate, cyclohexyl 2-(4-cyanophenyl)acrylate, dodecyl 2-(4-cyanophenyl)acrylate, stearyl 2-(4-cyanophenyl)acrylate, carboxyethyl 2-(4-cyanophenyl)acrylate, pyrenylmethyl 2-(4-cyanophenyl)acrylate, cholesteroyl 2-(4-cyanophenyl)acrylate, and the like).

Specific examples of the compound having an anionic polymerizable functional group which satisfies the condition 2 include the following compounds, but the present invention is not interpreted to be limited thereto. Meanwhile, in (b-14) to (b-16), numerical values in parentheses represent mass ratios.

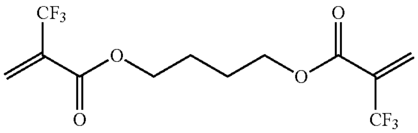
(b-1)

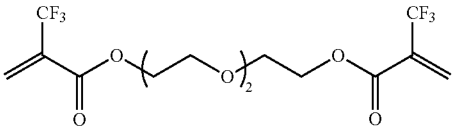
(b-2)

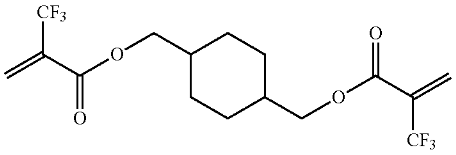
(b-3)

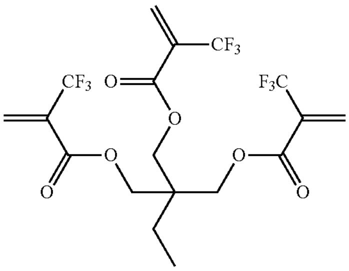
(b-4)

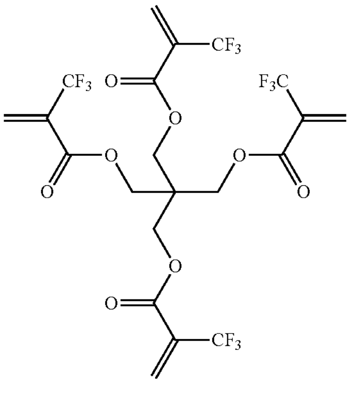
(b-5)

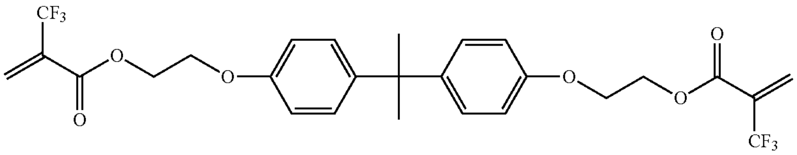
(b-6)

-continued
(b-7)
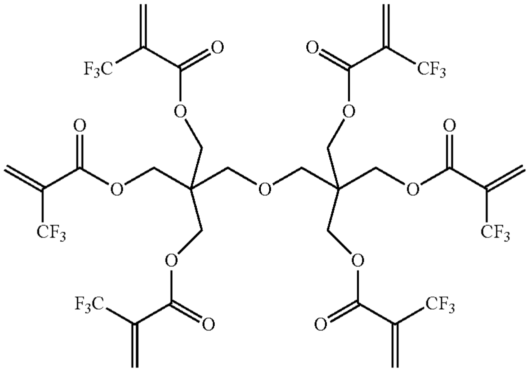
(b-8)
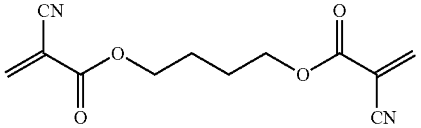
(b-9)
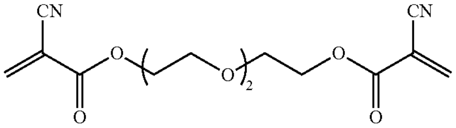
(b-10)
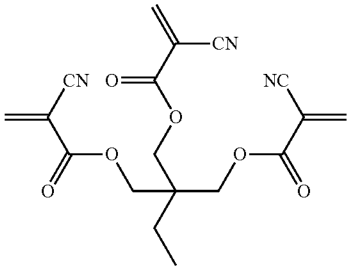
(b-11)
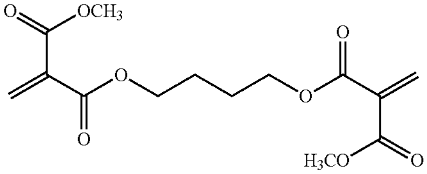
(b-12)
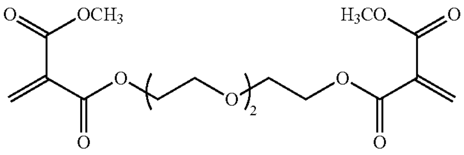
(b-13)
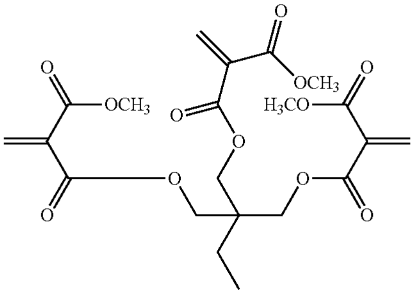
(b-14)
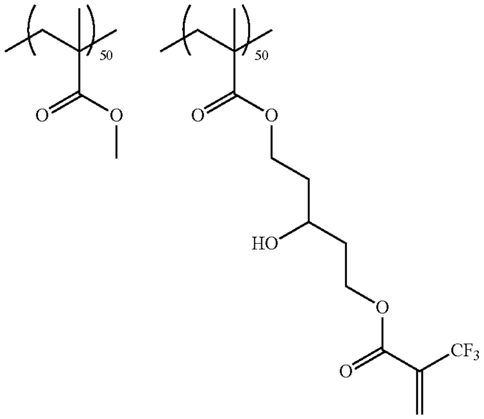
(b-15)
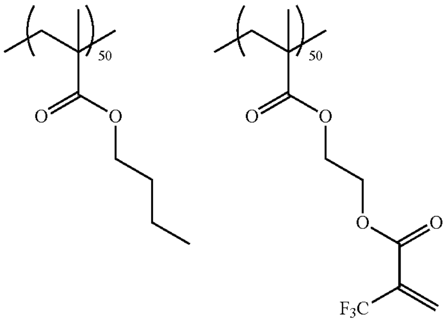

-continued (b-16)

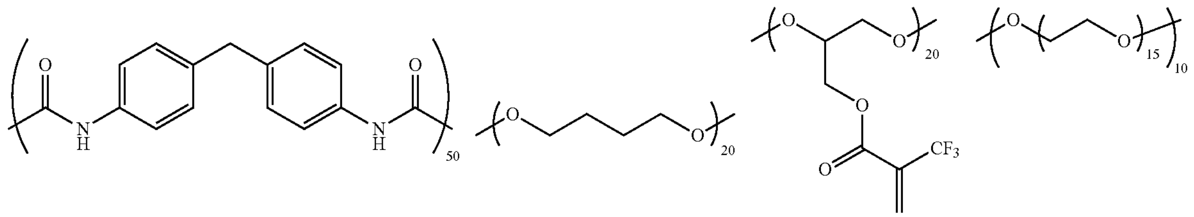

In the present specification, substituents (also linking groups) that are not clearly expressed as substituted or unsubstituted may have an appropriate substituent therein. What has been described above shall also apply to compounds that are not clearly expressed as substituted or unsubstituted. Preferred examples of the substituent include the substituent P described below.

Examples of the substituent P include the following substituents:

an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, 1-carboxymethyl, or the like), an alkenyl group (preferably an alkenyl group having 2 to 20 carbon atoms, for example, vinyl, allyl, oleyl, or the like), an alkynyl group (preferably an alkynyl group having 2 to 20 carbon atoms, for example, ethynyl, butadiynyl, phenylethynyl, or the like), a cycloalkyl group (preferably a cycloalkyl group having 3 to 20 carbon atoms, for example, cyclopropyl, cyclopentyl, cyclohexyl, 4-methylcyclohexyl, or the like; here, in the case of being referred to as an alkyl group in the present specification, generally, a cycloalkyl group is also referred to), an aryl group (preferably an aryl group having 6 to 26 carbon atoms, for example, phenyl, 1-naphthyl, 4-methoxyphenyl, 2-chlorophenyl, 3-methylphenyl, or the like), an aralkyl group (preferably an aralkyl group having 7 to 23 carbon atoms, for example, benzyl, phenethyl, or the like), a heterocyclic group (preferably a heterocyclic group having 2 to 20 carbon atoms, more preferably a 5- or 6-membered heterocycle group having at least one selected from an oxygen atom, a sulfur atom, and a nitrogen atom as a ring-constituting atom, for example, tetrahydropyranyl, tetrahydrofuranyl, 2-pyridyl, 4-pyridyl, 2-imidazolyl, 2-benzimidazolyl, 2-thiazolyl, 2-oxazolyl, pyrrolidone group, or the like), an alkoxy group (preferably an alkoxy group having 1 to 20 carbon atoms, for example, methoxy, ethoxy, isopropyloxy, benzyloxy, or the like), an aryloxy group (preferably an aryloxy group having 6 to 26 carbon atoms, for example, phenoxy, 1-naphthyloxy, 3-methylphenoxy, 4-methoxyphenoxy, or the like; here, in the case of being referred to as an alkoxy group in the present specification, generally, an aryloyl group is also referred to), an alkoxycarbonyl group (preferably an alkoxycarbonyl group having 2 to 20 carbon atoms, for example, ethoxycarbonyl, 2-ethylhexyloxycarbonyl, or the like), an aryloxycarbonyl group (preferably an aryloxycarbonyl group having 6 to 26 carbon atoms, for example, phenoxycarbonyl, 1-naphthyloxycarbonyl, 3-methylphenoxycarbonyl, 4-methoxyphenoxycarbonyl, or the like), an amino group (preferably an amino group, alkylamino group, or arylamino group having 0 to 20 carbon atoms, for example, amino, N,N-dimethylamino, N,N-diethylamino, N-ethylamino, anilino, or the like), a sulfamoyl group (preferably a sulfamoyl group having 0 to 20 carbon atoms, for example, N,N-dimethylsulfamoyl, N-phenylsulfamoyl, or the like), an acyl group (preferably an acyl group having 1 to 20 carbon atoms, for example, acetyl, propionyl, butyryl, or the like), an aryloyl group (preferably an aryloyl group having 7 to 23 carbon atoms, for example, benzoyl or the like; here, in the case of being referred to as an acyl group in the present specification, generally, an aryloyl group is also referred to), an acyloxy group (preferably an acyloxy group having 1 to 20 carbon atoms, for example, acetyloxy, or the like), an aryloyloxy group (preferably an aryloyloxy group having 7 to 23 carbon atoms, for example, benzoyloxy, or the like; here, in the case of being referred to as an acyloxy group in the present specification, generally, an aryloyloxy group is also referred to), a carbamoyl group (preferably a carbamoyl group having 1 to 20 carbon atoms, for example, N,N-dimethylcarbamoyl, N-phenylcarbamoyl, or the like), an acylamino group (preferably an acylamino group having 1 to 20 carbon atoms, for example, acetylamino, benzoylamino, or the like), an alkylsulfanyl group (for example, an alkylsulfamoyl group having 1 to 20 carbon atoms, for example, methylsulfanyl, ethylsulfanyl, isopropylsulfanyl, benzylsulfanyl, or the like), an arylsulfanyl group (preferably an arylsulfanyl group having 6 to 26 carbon atoms, for example, phenylsulfanyl, 1-naphthylsulfanyl, 3-methylphenylsulfanyl, 4-methoxyphenylsulfanyl, or the like), an alkylsulfonyl group (preferably an alkylsulfonyl group having 1 to 20 carbon atoms, for example, methylsulfonyl, ethylsulfonyl, or the like), an arylsulfonyl group (preferably an arylsulfonyl group having 6 to 22 carbon atoms, for example, benzenesulfonyl or the like), an alkylsilyl group (preferably an alkylsilyl group having 1 to 20 carbon atoms, for example, monomethylsilyl, dimethylsilyl, trimethylsilyl, triethylsilyl, or the like), an arylsilyl group (preferably an arylsilyl group having 6 to 42 carbon atoms, for example, triphenylsilyl, or the like), an alkoxysilyl group (preferably an alkoxysilyl group having 1 to 20 carbon atoms, for example, monomethoxysilyl, dimethoxysilyl, trimethoxysilyl, triethoxysilyl, or the like), an aryloxysilyl group (preferably an aryloxysilyl group having 6 to 42 carbon atoms, for example, triphenyloxysilyl, or the like), a phosphoyl group (preferably a phosphoryl group having 0 to 20 carbon atoms, for example, $-OP(=O)(R^P)_2$), a phosphonyl group (preferably a phosphonyl group having 0 to 20 carbon atoms, for example, $-P(=O)(R^P)_2$), a phosphinyl group (preferably a phosphinyl group having 0 to 20 carbon atoms, for example, $-P(R^P)_2$), a (meth)acryloyl group, a (meth)acryloyloxy group, a (meth)acryloylimino group (a (meth)acrylamide group), a hydroxyl group, a sulfanyl group, a carboxyl group, a phosphoric acid group, a phosphoric acid group, a sulfonic acid group, a cyano group, and a halogen atom (for example, a fluorine atom, a chlorine atom, a bromine atom, an iodine atom, or the like).

In addition, in the respective groups exemplified as the substituent P, the substituent P may be further substituted.

In a case in which a compound, a substituent, a linking group, and the like has an alkyl group, an alkylene group, an alkenyl group, an alkenylene group, an alkynyl group, an alkynylene group, and/or the like, the compound, the substituent, the linking group, and the like may have a cyclic shape or a chain shape, may be linear or branched, and may be substituted or unsubstituted as described above.

The compound having an anionic polymerizable functional group which is used in the present invention is preferably the compound having two or more anionic polymerizable functional groups represented by General Formula (1B) and more preferably represented by General Formula (1b). The above-described compound having an anionic polymerizable functional group is preferred since the compound has two or more anionic polymerizable functional groups in a molecule, and thus a strong cross-linked body by anionic polymerization, that is, a strong cured film is formed, and the bonding property and the cycle service life can be improved.

The compound having an anionic polymerizable functional group which is represented by General Formula (1A) or (1a) can be obtained by, for example, acid-chlorinating a corresponding anionic polymerizable carboxylic acid in the presence of a thionyl chloride or a phthalic acid dichloride, then, purifying the anionic polymerizable carboxylic acid through distillation, and treating the anionic polymerizable carboxylic acid with 2,6-lutidine and an alcohol, thereby esterifying the anionic polymerizable carboxylic acid.

The compound having an anionic polymerizable functional group which is represented by General Formula (1b) can be synthesized using, for example, the following method. That is, the compound can be obtained by reacting a compound having an anionic polymerizable functional group and a reactive functional group with a terminal portion in X of the compound (a hydroxy group, a carboxy group, an amino group, a mercapto group, or the like) with a compound in which a terminal portion in X which serves as a mother nucleus of a multibranched-type (star-type, hyperbranched-type, or dendrimer-type) skeleton is a nucleophilic functional group such as a hydroxy group, a carboxy group, an amino group, or a mercapto group or a compound having a leaving group such as a halogen atom (Cl, Br, or I), -OTs, or -OMs. Here, Ts represents a tosyl group, and Ms represents a mesyl group.

For example, the compound having an anionic polymerizable functional group which is represented by General Formula (1b) can be obtained by forming an ester bond from a reaction between a hydroxy group and a carboxy group, an amide bond from a reaction between an amino group and a carboxy group, and a thioester bond from a reaction between a mercapto group and a carboxy group.

An ether bond, an amide bond, and a thioether bond are formed respectively by reacting a hydroxy group, an amino group, and a mercapto group with the leaving group such as a halogen atom (Cl, Br, or I), -OTs, or -OMs, whereby the compound having an anionic polymerizable functional group which is represented by General Formula (1b) can be obtained.

The compound having an anionic polymerizable functional group represented by General Formula (1B) as the anionic polymerizable functional group can also be synthesized using the same method as for the compound having an anionic polymerizable functional group represented by General Formula (1b).

The molecular weight of the compound having an anionic polymerizable functional group which is used in the present invention is preferably 100 to 200,000, more preferably 100 to 5,000, and still more preferably 100 to 1,000 from the viewpoint of the rate of anionic polymerization and/or the crosslinking rate, or the non-volatility.

In a case in which the compound having an anionic polymerizable functional group has a repeating unit, the molecular weight refers to the mass average molecular weight. The mass average molecular weight can be measured using, for example, GPC.

The content of the compound having an anionic polymerizable functional group which is used in the present invention in the solid electrolyte composition is preferably less than 5% by mass, more preferably less than 3% by mass, and particularly preferably less than 2% by mass with respect to a solid content of 100% by mass since the ion conductivity is not easily impaired while imparting a sufficient bonding property. The lower limit is not particularly limited, but is preferably 0.1% by mass or more.

One kind of the compound having an anionic polymerizable functional group which is used in the present invention may be used singly or two or more kinds of the compounds may be used in combination. The combination of two or more kinds of the compounds is preferably a combination of $H_2C{=}C(CN)(COOR^5)$ and $H_2C{=}C(CF_3)(COOR^5)$ and most preferably a combination of cyanoacrylate and trifluoromethylacrylate. In this case, the proportion of anionic polymerizable functional groups having a cyano group in all of the anionic polymerizable functional groups is preferably 0% to 2% by mass or more than 30% by mass and 100% by mass, and more preferably more than 30% by mass and 100% by mass or less.

In addition, the solid electrolyte composition of the present invention may contain additional functional additives described below.

All-solid state secondary batteries formed using the solid electrolyte composition containing the compound having an anionic polymerizable functional group which is used in the present invention exhibit a favorable bonding property and excellent cycle characteristics as described above.

(Particle Dispersant)

The solid electrolyte composition of the present invention also preferably contains a particle dispersant.

The particle dispersant is an organic compound that is unevenly present on surfaces due to a chemical bond with or physical adsorption to a positive electrode active material or a negative electrode active material and preferably has a reactive unsaturated bond. In a case in which the particle dispersant is added to the solid electrolyte composition, it is possible to suppress agglomeration even in a case in which the concentration of any of the inorganic solid electrolyte and electrode active materials is high and form uniform electrode layers and/or solid electrolyte layers, and an effect of improving the output of all-solid state secondary batteries is exhibited.

In addition, it is also preferable to jointly use the compound having an anionic polymerizable functional group which is used in the present invention and a particle dispersant having a reactive unsaturated bond capable of anionic addition since it is possible to further enhance the bonding property between the inorganic solid electrolyte and active materials. This is considered to be because the reactive unsaturated bond capable of anionic addition in the particle dispersant is added to a growth terminal of the compound having an anionic polymerizable functional group so as to form a covalent bond, whereby the inorganic solid electrolyte and active materials are linked together through an anionic polymer with the covalent bond.

The particle dispersant is preferably made of a low-molecular-weight compound having a molecular weight of 70 or more and less than 3,000 or an oligomer and contains at least one kind of functional group represented by the following group of functional groups (A) and more preferably made of a low-molecular-weight compound having a molecular weight of 70 or more and less than 3,000 or an oligomer and contains at least one kind of functional group represented by the following group of functional groups (A) and the reactive unsaturated bond capable of anionic addition in the same molecule.

Group of functional groups (A): acidic groups (for example, a carboxy group, a sulfonic acid group, and a phosphoric acid group), groups having a basic nitrogen atom, an alkoxysilyl group, an epoxy group, an oxetanyl group, an isocyanate group, a cyano group, a sulfanyl group, a hydroxyl group, and condensed hydrocarbon groups of three or more rings (for example, a pyrenyl group)

The molecular weight of the particle dispersant is preferably 70 or more and less than 3,000, more preferably 100 or more and less than 2,000, and still more preferably 500 or more and less than 1,000. In a case in which the molecular weight is too great, particles easily agglomerate, and there is a concern that the output of all-solid state secondary batteries may decrease. In addition, in a case in which the molecular weight is too small, the solid electrolyte composition is likely to volatilize in a stage of applying and drying the solid electrolyte composition.

Meanwhile, in the case of an oligomer, the molecular weight refers to the mass average molecular weight. The mass average molecular weight can be measured using, for example, GPC.

In the group of functional groups (A), acidic groups, groups having a basic nitrogen atom, a cyano group, and condensed hydrocarbon groups of three or more rings are preferred, acidic groups, groups having a basic nitrogen atom, and a cyano group are more preferred, and acidic groups are still more preferred. Among acidic groups, a carboxy group is most preferred.

Examples of the group having an unsaturated bond capable of anionic addition in the particle dispersant include a (meth)acryloyl group, a (meth)acrylamide group, a vinyl group, and a styryl group, which are preferred.

Specific examples of the particle dispersant include (meth)acrylic acid, (2-pyrenyl)methyl (meth)acrylate, carboxylic acid partially-modified bodies of erythritoltetraacrylate (trisubstituted acrylate and monosubstituted carboxylic acid), and carboxylic acid partially-modified bodies of dipentaerythritolhexamethacrylate (tetrasubstituted acrylate and disubstituted carboxylic acid), which are preferred.

One kind of particle dispersant may be used singly or two or more kinds of particle dispersants may be used in combination.

The content in the solid electrolyte composition is preferably 0.1% by mass or more, more preferably 0.5% by mass or more, and particularly preferably 1% by mass or more with respect to a solid content of 100% by mass from the viewpoint of the dispersion stability of solid electrolyte composition slurries. In addition, from the viewpoint of the ion conductivity that is not easily impaired, the upper limit of the content is preferably 5% by mass or less, more preferably 3% by mass or less, and particularly preferably 2% by mass or less.

(Binder)

The solid electrolyte composition of the present invention also preferably contains a binder.

A binder that is used in the present invention is not particularly limited as long as the binder is an organic polymer.

A binder that can be used in the present invention is preferably a binder that is, generally, used as a bonding agent for a positive electrode or a negative electrode for battery materials, is not particularly limited, and is, for example, preferably a binder made of a resin described below.

Examples of fluorine-containing resins include polytetrafluoroethylene (PTFE), polyvinylene difluoride (PVdF), and copolymers of polyvinylene difluoride and hexafluoropropylene (PVdF-HFP)), and the like.

Examples of hydrocarbon-based thermoplastic resins include polyethylene, polypropylene, styrene butadiene rubber (SBR), hydrogenated styrene butadiene rubber (HSBR), butylene rubber, acrylonitrile butadiene rubber (also referred to as butadiene-acrylonitrile copolymers), polybutadiene, polyisoprene, and the like.

Examples of acrylic resins include poly(methyl (meth) acrylate), poly(ethyl (meth)acrylate), poly(isopropyl (meth) acrylate), poly(isobutyl (meth)acrylate), poly(butyl (meth) acrylate), poly(hexyl (meth)acrylate), poly(octyl (meth) acrylate), poly(dodecyl (meth)acrylate), poly(stearyl (meth) acrylate), poly(2-hydroxyethyl (meth)acrylate), poly((meth) acrylic acid), poly(benzyl (meth)acrylate), poly(glycidyl (meth)acrylate), poly(dimethylaminopropyl (meth)acrylate), copolymers of monomers constituting the above-described resins, and the like.

In addition, copolymers with other vinyl-based monomers are also preferably used. Examples thereof include methyl (meth)acrylate-styrene copolymers, methyl (meth)acrylate-acrylonitrile copolymers, butyl (meth)acrylate-acrylonitrile-styrene copolymers, and the like.

In addition to the above-described radical polymerization-based polymers, polycondensation-based polymers can also be used. As the polycondensation-based polymers, for example, it is possible to preferably use a urethane resin, a urea resin, an amide resin, an imide resin, a polyester resin, and the like.

The polycondensation-based polymer preferably has a hard segment portion and a soft segment portion. The hard segment portion represents a portion capable of forming an intermolecular hydrogen bond, and the soft segment portion generally represents a flexible portion having a glass transition temperature (Tg) of room temperature (25±5° C.) or lower and a molecular weight of 400 or more.

One kind of polycondensation-based polymer may be used singly or two or more kinds of polycondensation-based polymers may be used in combination.

Regarding the glass transition temperature of the binder, the upper limit is preferably 50° C. or lower, more preferably 0° C. or lower, and most preferably −20° C. or lower. The lower limit is preferably −100° C. or higher, more preferably −70° C. or higher, and particularly preferably −50° C. or higher.

The glass transition temperature (Tg) is measured using a dried specimen and a differential scanning calorimeter "X-DSC7000" (trade name, manufactured by SII·NanoTechnology Inc.) under the following conditions. The glass transition temperature of the same specimen is measured twice, and the second measurement result is employed.

Atmosphere in the measurement chamber: Nitrogen (50 mL/min)

Temperature-increase rate: 5° C./min

Measurement-start temperature: −100° C.

Measurement-end temperature: 200° C.

Specimen pan: Aluminum pan

Mass of the measurement specimen: 5 mg

Calculation of Tg: Tg is calculated by rounding off the middle temperature between the declination-start point and the declination-end point in the DSC chart to the integer.

The polymer constituting the binder preferably has a moisture concentration of 100 ppm or less (mass-based) and a Tg of 100° C. or lower.

In addition, the polymer constituting the binder may be dried by being crystallized or may be used in a polymer solution form. The amount of a metal-based catalyst (a urethanization or polyesterification catalyst=tin, titanium, or bismuth) is preferably small. The concentration of metal in the copolymer is preferably set to 100 ppm or less (mass-based) by decreasing the amount of the metal during polymerization or removing the catalyst by means of crystallization.

A solvent that is used for the polymerization reaction of the polymer is not particularly limited. Meanwhile, solvents that do not react with the inorganic solid electrolyte and active materials and furthermore do not decompose the inorganic solid electrolyte and active materials are desirably used. For example, it is possible to use hydrocarbon-based solvents (toluene, heptane, and xylene), ester-based solvents (ethyl acetate and propylene glycol monomethyl ether acetate), ether-based solvents (tetrahydrofuran, dioxane, and 1,2-diethoxyethane), ketone-based solvents (acetone, methyl ethyl ketone, and cyclohexanone), nitrile-based solvents (acetonitrile, propionitrile, butyronitrile, and isobutyronitrile), halogen-based solvents (dichloromethane and chloroform), and the like.

The mass average molecular weight of the polymer constituting the binder is preferably 10,000 or more, more preferably 20,000 or more, and still more preferably 50,000 or more. The upper limit is preferably 1,000,000 or less, more preferably 200,000 or less, and still more preferably 100,000 or less.

In the present invention, the molecular weight of the polymer refers to the mass average molecular weight unless particularly otherwise described.

In a case in which favorable interface resistance-reducing and maintaining properties are taken into account in a case in which the binder is used in all-solid state secondary batteries, the content of the binder in the solid electrolyte composition is preferably 0.01% by mass or more, more preferably 0.1% by mass or more, and still more preferably 1% by mass or more with respect to a solid component of 100% by mass. From the viewpoint of battery characteristics, the upper limit is preferably 20% by mass or less, more preferably 10% by mass or less.

In the present invention, the mass ratio of the total mass of the inorganic solid electrolyte and electrode active materials that are contained as necessary to the mass of the binder [(the mass of the inorganic solid electrolyte+the mass of electrode active materials)/the mass of the binder] is preferably in a range of 1,000 to 1. Furthermore, this ratio is more preferably 500 to 2 and still more preferably 100 to 10.

The binder is also preferably polymer particles holding a particle shape. In the present invention, poly(methyl (meth) acrylate) (PMMA), a methyl methacrylate-methacrylic acid copolymer (PMMA-PMA), or a methyl methacrylate-ethyl methacrylate phosphate copolymer (PMMA-PHM) is preferably used.

Here, the "polymer particles" refer to particles which are not completely dissolved even in the case of being added to a dispersion medium described below, are dispersed in the dispersion medium while maintaining the particle shape, and exhibit an average particle diameter of more than 0.01 μm.

The shape of the polymer particle is not limited as long as the polymer particle hold a solid form. The polymer particles may be monodispersed or polydispersed. The polymer particle may have a truly spherical shape or a flat shape and, furthermore, may have an irregular shape. The surface of the polymer particle may be flat or form an uneven shape. The polymer particle may have a core-shell structure, and the core (inner core) and the shell (outer shell) may be constituted of the same material or may be constituted of different materials. In addition, the polymer particle may be hollow, and the hollow rate is also not limited.

The polymer particles can be synthesized using a method in which the polymer particles are polymerized in the presence of a surfactant, an emulsifier, or a dispersant or a method in which the polymer particles are precipitated in a crystal shape as the molecular weight increases.

In addition, a method in which the existing polymer is mechanically crushed or a method in which fine particles are produced from a polymer liquid by means of re-precipitation may be used.

The average particle diameter of the polymer particles is preferably 0.01 μm to 100 μm, more preferably 0.05 μm to 50 μm, still more preferably 0.1 μm to 20 μm, and particularly preferably 0.2 μm to 10 μm.

Unless particularly otherwise described, the average particle diameter of the polymer particles that are used in the present invention refers to an average particle diameter according to measurement conditions and a definition described below.

One percent by mass of a dispersion liquid is prepared by diluting the polymer particles using a random solvent (a dispersion medium that is used to prepare the solid electrolyte composition, for example, heptane) in a 20 ml sample bottle. The diluted dispersion specimen is irradiated with 1 kHz ultrasonic waves for 10 minutes and then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., and the obtained volume-average particle diameter is used as the average particle diameter. Regarding other detailed conditions and the like, the description of JIS Z8828:2013"Particle size analysis-Dynamic light scattering method" is referred to as necessary. Five specimens are produced and measured per level, and the average values thereof are employed.

Meanwhile, the average particle diameter can be measured from the produced all-solid state secondary battery by, for example, disassembling the battery, peeling the electrodes off, then, measuring the average particle diameters of the electrode materials according to the above-described method for measuring the average particle diameter of the polymer particles, and excluding the measurement value of the average particle diameter of particles other than the polymer particles which has been measured in advance.

Meanwhile, as the binder that is used in the present invention, it is possible to use commercially available products. In addition, the binder can also be prepared using an ordinary method.

(Dispersion Medium)

The solid electrolyte composition of the present invention preferably contains a dispersion medium.

The dispersion medium needs to be capable of dispersing the respective components included in the solid electrolyte composition, and examples thereof include a variety of organic solvents. Specific examples of the dispersion medium include dispersion media described below.

Examples of alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of ether compound solvents include alkylene glycol alkyl ethers (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, and the like), dialkyl ethers (dimethyl ether, diethyl ether, diisopropyl ether, dibutyl ether, and the like), and cyclic ethers (tetrahydrofuran, dioxane(including each of 1,2-, 1,3- and 1,4-isomers)).

Examples of amide compound solvents include N,N-dimethylformamide, N-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, hexamethylphosphoric triamide, and the like.

Examples of amino compound solvents include triethylamine, diisopropylethylamine, tributylamine, and the like.

Examples of ketone compound solvents include acetone, methyl ethyl ketone, methyl isobutyl ketone, and cyclohexanone.

Examples of aromatic compound solvents include benzene, toluene, xylene, mesitylene, and the like.

Examples of aliphatic compound solvents include hexane, heptane, octane, decane, and the like.

Examples of nitrile compound solvents include acetonitrile, propionitrile, isobutyronitrile, and the like.

Examples of ester compound solvents include ethyl acetate, butyl acetate, propyl acetate, butyl butyrate, butyl pentanoate, and the like.

Examples of non-aqueous dispersion media include the aromatic compound solvents, the aliphatic compound solvents, and the like.

In the present invention, particularly, amino compound solvents, ether compound solvents, ketone compound solvents, aromatic compound solvents, and aliphatic compound solvents are preferred, and ether compound solvents, aromatic compound solvents, and aliphatic compound solvents are more preferred. In the present invention, it is preferable to further select the specific organic solvent described above using a sulfide-based inorganic solid electrolyte. In a case in which this combination is selected, no functional groups that are active to sulfide-based inorganic solid electrolytes are included, and thus sulfide-based inorganic solid electrolytes can be stably handled, which is preferable.

The boiling point of the dispersion medium at normal pressure (one atmospheric pressure) is preferably 50° C. or higher and more preferably 70° C. or higher. The upper limit is preferably 250° C. or lower and more preferably 220° C. or lower.

One kind of the dispersion medium may be used singly or two or more kinds of the dispersion media may be used in combination.

In the present invention, the content of the dispersion medium in the solid electrolyte composition can be appropriately set in consideration of the balance between the viscosity of the solid electrolyte composition and the drying load. Generally, the content thereof is preferably 20% to 99% by mass, more preferably 25% to 70% by mass, and particularly preferably 30% to 60% by mass of the solid electrolyte composition.

(Active Materials)

The solid electrolyte composition of the present invention may also contain active materials capable of intercalating and deintercalating ions of metal elements belonging to Group I or II of the periodic table. While described below, examples of the active materials include positive electrode active materials and negative electrode active materials, and transition metal oxides that are positive electrode active materials or metal oxides that are negative electrode active materials are preferred.

In the present invention, the solid electrolyte composition containing the active material (a positive electrode active material or a negative electrode active material) will be referred to as a composition for an electrode layer (a composition for a positive electrode layer or a composition for a negative electrode layer).

-Positive Electrode Active Material-

A positive electrode active material that the solid electrolyte composition of the present invention may contain is preferably a positive electrode active material capable of reversibly intercalating and deintercalating lithium ions. The above-described material is not particularly limited as long as the material has the above-described characteristics and may be transition metal oxides, elements capable of being complexed with Li such as sulfur, or the like.

Among these, as the positive electrode active material, transition metal oxides are preferably used, and transition metal oxides having a transition metal element $M^a$ (one or more elements selected from Co, Ni, Fe, Mn, Cu, and V) are more preferred. In addition, an element $M^b$ (an element of Group I (Ia) of the metal periodic table other than lithium, an element of Group II (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. The positive electrode active material is more preferably synthesized by mixing the element into the transition metal oxide so that the molar ratio of Li/$M^a$ reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, and cobalt fluorophosphates such as $Li_2CoPO_4F$.

Examples of the lithium-containing transition metal silicon acid compounds (ME) include $Li_2FeSiO_4$, $Li_2MnSiO_4$, $Li_2CoSiO_4$, and the like.

In the present invention, the transition metal oxides having a bedded salt-type structure (MA) are preferred, LCO or NMC is more preferred, and NMC is particularly preferred.

The shape of the positive electrode active material is not particularly limited, but is preferably particulate. The volume-average particle diameter (circle-equivalent average particle diameter) of the positive electrode active material is not particularly limited. For example, it is possible to set the volume-average particle diameter to 0.1 to 50 μm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The volume-average particle diameter (circle-equivalent average particle diameter) of positive electrode active material particles can be measured using a laser diffraction/scattering-type particle size distribution measurement instrument LA-920 (trade name, manufactured by Horiba Ltd.).

One kind of the positive electrode active material may be used singly or two or more kinds of the positive electrode active materials may be used in combination.

In the case of forming a positive electrode active material layer, the mass (mg) of the positive electrode active material per unit area ($cm^2$) of the positive electrode active material layer (weight per unit area) is not particularly limited and can be appropriately determined depending on the set battery capacity.

The content of the positive electrode active material in the solid electrolyte composition is not particularly limited, but is preferably 10% to 95% by mass, more preferably 30% to 90% by mass, still more preferably 50% to 85% by mass, and particularly preferably 55% to 80% by mass with respect to a solid content of 100% by mass.

-Negative Electrode Active Material-

A negative electrode active material that the solid electrolyte composition of the present invention may contain is preferably a negative electrode active material capable of reversibly intercalating and deintercalating lithium ions. The above-described material is not particularly limited as long as the material has the above-described characteristics, and examples thereof include carbonaceous materials, metal oxides such as tin oxide, silicon oxide, metal complex oxides, a lithium single body, lithium alloys such as lithium aluminum alloys, metals capable of forming alloys with lithium such as Sn, Si, and In, and the like. Among these, carbonaceous materials or lithium complex oxides are preferably used in terms of reliability. In addition, the metal complex oxides are preferably capable of absorbing and deintercalating lithium. The materials are not particularly limited, but preferably contain titanium and/or lithium as constituent components from the viewpoint of high-current density charging and discharging characteristics.

The carbonaceous material that is used as the negative electrode active material is a material substantially made of carbon. Examples thereof include petroleum pitch, carbon black such as acetylene black (AB), graphite (natural graphite and artificial graphite such as highly oriented pyrolytic graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, planar graphite, and the like.

The metal oxides and the metal complex oxides which are applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 20° to 40° in an X-ray diffraction method in which CuKα rays are used and may have crystalline diffraction lines. The highest intensity in the crystalline diffraction line appearing at a 2θ value of 40° or more and 70° or less is preferably 100 times or less and more preferably five times or less of the diffraction line intensity at the peak of the broad scattering band appearing at a 2θ value of 20° or more and 40° or less and particularly preferably does not have any crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be complex oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the absorption and deintercalation of lithium ions is small, and thus the high-speed charging and discharging characteristics are excellent, and the deterioration of electrodes is suppressed, whereby it becomes possible to improve the service lives of lithium ion secondary batteries.

In the present invention, hard carbon or graphite is preferably used, and graphite is more preferably used. Meanwhile, in the present invention, one kind of the carbonaceous material may be used singly or two or more kinds of the carbonaceous materials may be used in combination.

The shape of the negative electrode active material is not particularly limited, but is preferably particulate. The average particle diameter of the negative electrode active material is preferably 0.1 to 60 μm. In order to provide a predetermined particle diameter, an ordinary crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be carried out. The average particle diameter of negative electrode active material particles can be measured using the same method as the method for measuring the volume-average particle diameter of the positive electrode active material.

The chemical formulae of the compounds obtained using a firing method can be computed using an inductively coupled plasma (ICP) emission spectroscopic analysis method as a measurement method from the mass difference of powder before and after firing as a convenient method.

Preferred examples of negative electrode active materials that can be jointly used with the amorphous oxide negative electrode active material mainly including Sn, Si, or Ge include carbon materials capable of absorbing and deintercalating lithium ions or lithium metal, lithium, lithium alloys, and metal capable of forming an alloy with lithium.

In the present invention, a Si-based negative electrode is preferably applied. Generally, a Si negative electrode is capable of absorbing a larger number of Li ions than carbon negative electrodes (graphite, acetylene black, and the like). That is, the amount of Li ions absorbed per unit weight increases. Therefore, it is possible to increase the battery capacity. As a result, there is an advantage that the driving time of batteries can be extended.

One kind of the negative electrode active material may be used singly or two or more kinds of the negative electrode active materials may be used in combination.

In the case of forming a negative electrode active material layer, the mass (mg) of the negative electrode active material per unit area ($cm^2$) in the negative electrode active material layer (weight per unit area) is not particularly limited and can be appropriately determined depending on the set battery capacity.

The content of the negative electrode active material in the solid electrolyte composition is not particularly limited, but is preferably 10% to 80% by mass, more preferably 20% to 80% by mass, more preferably 30% to 80% by mass, and still more preferably 40% to 75% by mass with respect to a solid content of 100% by mass.

The surfaces of the positive electrode active material and/or the negative electrode active material may be coated with a surface coating agent. Examples of the surface coating agent include metal oxides containing Ti, Nb, Ta, W, Zr, Si, or Li, and specific examples thereof include titanium oxide spinel, tantalum-based oxides, niobium-based oxides, lithium niobate-based compounds, and the like. More specific examples thereof include $Li_4Ti_5O_{12}$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $LiBO_2$, and the like.

In addition, a surface treatment may be carried out on the surfaces of electrodes including the positive electrode active material and/or the negative electrode active material using sulfur, phosphorous, or the like.

(Auxiliary Conductive Agent)

The solid electrolyte composition of the present invention may also appropriately contain an auxiliary conductive agent that is used to improve the electron conductivity of the active materials as necessary. As the auxiliary conductive agent, ordinary auxiliary conductive agents can be used. The auxiliary conductive agent may be, for example, graphite such as natural graphite and artificial graphite, carbon black such as acetylene black, Ketjen black, and furnace black, irregular carbon such as needle cokes, a carbon fiber such as a vapor-grown carbon fiber or a carbon nanotube, or carbonaceous materials such as graphene and fullerene, all of which are electron-conductive materials, or may be metal powder or a metal fiber of copper, nickel, and the like, and a conductive polymer such as polyaniline, polypyrrole, polythiophene, polyacetylene, or a polyphenylene derivative may also be used. In addition, these auxiliary conductive agents may be used singly or two or more auxiliary conductive agents may be used.

In a case in which the solid electrolyte composition of the present invention includes the auxiliary conductive agent, the content of the auxiliary conductive agent in the solid electrolyte composition of the present invention is preferably 0% to 10% by mass.

(Lithium Salt)

The solid electrolyte composition of the present invention preferably also contains a lithium salt (supporting electrolyte).

As the lithium salt, lithium salts that are ordinarily used in this kind of products can be preferably used without any particular limitations, and examples thereof include the lithium salts that are ordinarily used in this kind of products.

The present lithium salt is different from a lithium salt enclosed in the binder particles since the present lithium salt is not enclosed in binder particles (a polymer forming the binder particles) (for example, the present lithium salt is singly present in the solid electrolyte composition).

The content of the lithium salt is preferably 0 parts by mass or more and more preferably 5 parts by mass or more with respect to 100 parts by mass of the solid electrolyte. The upper limit is preferably 50 parts by mass or less and more preferably 20 parts by mass or less.

(Preparation of Solid Electrolyte Composition)

A method for manufacturing a solid electrolyte composition of the present invention includes a step (a1) of dispersing the inorganic solid electrolyte in the presence of the dispersion medium so as to produce a slurry and a step (b1) of adding the compound having an anionic polymerizable functional group to the obtained slurry.

In the step (a1), the slurry can be produced by mixing the inorganic solid electrolyte and the dispersion medium using a variety of mixers. The mixing device is not particularly limited, and examples thereof include a ball mill, a beads mill, a planetary mixer, a blade mixer, a roll mill, a kneader, and a disc mill. The mixing conditions are not particularly limited; however, in the case of using a ball mill, the inorganic solid electrolyte and the dispersion medium are preferably mixed together at 150 to 700 rpm (rotation per minute) for one hour to 24 hours.

In the step (b1), it is preferable to mix the compound having an anionic polymerizable functional group into the slurry, and the above-described mixing device can be used.

The mixing conditions are not particularly limited as long as the compound having an anionic polymerizable functional group does not cure due to the progress of anionic polymerization, and, in the case of using a ball mill, the compound having an anionic polymerizable functional group is preferably mixed into the slurry at 50 to 200 rpm (rotation per minute) for one minute to 30 minutes.

In the case of preparing the solid electrolyte composition containing other components such as the particle dispersant, the components are preferably added and mixed to the inorganic solid electrolyte and the dispersion medium before the step (b1) and more preferably dispersed together with the inorganic solid electrolyte in the step (a1).

In the case of preparing the solid electrolyte composition containing an active material, the active material is preferably added and mixed to the obtained slurry after the step (a1) and more preferably mixed together with the compound having an anionic polymerizable functional group in the step (b1).

The storage of the prepared solid electrolyte composition is not particularly limited as long as the solid electrolyte composition does not cure due to the progress of anionic polymerization, but the solid electrolyte composition is preferably stored at 35° C. or lower (more preferably at 25° C. or lower and still more preferably at lower than 5° C.) after the preparation. In addition, the solid electrolyte composition is preferably used for the production of solid electrolyte-containing sheets and/or the production of all-solid state secondary batteries within one month (in the case of being stored at 5° C.) from the preparation.

(Anionic Polymerization Reaction)

The compound having an anionic polymerizable functional group which is used in the present invention forms a polymer (hereinafter, also referred to as the anionic polymer) through the progress of anionic polymerization using an anionic functional group present on the surface of the inorganic solid electrolyte and/or the active material (preferably the surfaces of solid particles) as an anionic polymerization initiating species.

In the case of sulfide-based inorganic solid electrolytes, $PS_4^{3-}$ in $Li_3PS_4$ or $P_3S_{11}^{7-}$ in $Li_7P_3S_{11}$ is capable of serving as an anionic polymerization initiating species, and, in the case of oxide-based inorganic solid electrolyte, $(La_3Zr_2O_{12})^{7-}$ in $Li_7La_3Zr_2O_{12}$ (LLT) or $(La_3Ta_2O_{12})^{5-}$ in $Li_5La_3Ta_2O_{12}$ (LLZ) is capable of serving as an anionic polymerization initiating species. In a case in which the reaction system undergoes the above-described anionic polymerization initiation stage, a covalent bond is formed between the inorganic solid electrolyte and the anionic polymer, and a stronger bonding property is developed. In a case in which the inorganic solid electrolyte and a polymer that has been provided with a large molecular weight in advance have been added thereto, no bonds are formed between the inorganic solid electrolyte and the polymer, and thus a favorable bonding property cannot be developed.

The solid electrolyte composition of the present invention may also contain an anionic polymerization initiator for the purpose of accelerating the anionic polymerization in addition to the inorganic solid electrolyte.

The anionic polymerization initiator is not particularly limited as long as the anionic polymerization initiator is capable of generating anions, and examples of strong anionic polymerization initiators include potassium, alkyl (aryl) potassium, sodium, alkyl (aryl) sodium, lithium, alkyl (aryl) lithium, Grignard reagent, dialkyl (aryl) magnesium, trialkyl (aryl) aluminum, dialkyl zinc, alkoxy (aryloxy) potassium, alkoxy (aryloxy) sodium, alkoxy (aryloxy) lithium, alkylthio (arylthio) potassium, alkylthio (arylthio) sodium, and alkylthio (arylthio) lithium. Examples of weak anionic polymerization initiators include pyridines, amines, carboxylic acids, metal carboxylates, metal thiocarboxylates, alkyl thiols, water, and the like.

The amount of the anionic polymerization initiator added is preferably 0.1 mol % to 10 mol % and more preferably 1 mol % to 3 mol % of the compound having an anionic polymerizable functional group.

Specifically, due to the progress of the anionic polymerization of the compound having an anionic polymerizable functional group which satisfies the condition 1 or 2, anionic polymers respectively having a repeating unit represented by General Formula (2A) or (2B) are formed. The anionic polymer has chemical bonds with the surfaces of the solid particles of the inorganic solid electrolyte or the like.

General Formula (2A)

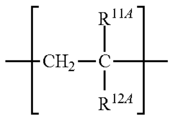

General Formula (2B)

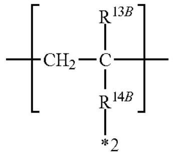

In the formula, $R^{11A}$ and $R^{12A}$ each independently represent a monovalent electron-withdrawing group, $R^{13B}$ represents a monovalent electron-withdrawing group or $—R^{14B}—*_2$, and $R^{14B}$ represents a divalent electron-withdrawing group in which a bonding portion with a carbon atom to which $R^{13B}$ and $R^{14B}$ bond withdraws electrons. $*_2$ represents a bonding site.

$R^{11A}$, $R^{12A}$, $R^{13B}$, and $R^{14B}$ may link together to form a ring.

$R^{11A}$, $R^{12A}$, $R^{13B}$, and $R^{14B}$ in General Formulae (2A) and (2B) are identical to $R^{1A}$, $R^{2A}$, $R^{3B}$, and $R^{4B}$ in General Formulae (1A) and (1B). Meanwhile, $*_2$ in General Formula (2B) is a bonding site corresponding to $*_1$ in General Formula (1B).

In addition, due to the progress of the anionic polymerization of the compound having an anionic polymerizable functional group which is represented by General Formula (1a) or (1b), anionic polymers respectively having a repeating unit represented by General Formula (2a) or (2b) are formed. The anionic polymer has chemical bonds with the surfaces of the solid particles of the inorganic solid electrolyte or the like.

General Formula (2a)

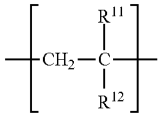

General Formula (2b)

$$(R^{a1})_{m1}—X^1—(Z)_{n1}$$

In the formulae, $R^{11}$ and $R^{12}$ each independently represent an alkyl group substituted with a nitro group, a cyano group, $—C(═O)OR^{15}$, $—C(═O)R^{16}$, or a fluoro group or an aryl group substituted with a fluoro group, $R^{15}$ and $R^{16}$ each are independently a hydrogen atom, an alkyl group, or an aryl group, an alkoxycarbonyl group, or an acyl group. $R^{11}$ and $R^{12}$ may link together to form a ring.

Z represents a group represented by General Formula (2b-z). $R^{a1}$ represents a hydrogen atom or an organic group, $X^1$ represents an $m^1$+$n^1$-valent linking group, $m^1$ is an integer of 0 to 10, and $n^1$ is an integer of 2 to 10.

General Formula (2b-z)

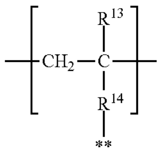

In the formula, $R^{13}$ is identical to $R^{11}$. $R^{14}$ represents an alkylene group substituted with *—C(═O)O$R^{17}$—, *—C(═O)$R^{18}$—, or a fluoro group or an arylene group substituted with a fluoro group, $R^{17}$ and $R^{18}$ each independently represent a single bond, an alkylene group, or an arylene group. * represents a bonding portion with a carbon atom to which $R^{13}$ and $R^{14}$ bond. $R^{13}$ and $R^{14}$ may link together to form a ring. ** represents a bonding portion with $X^1$.

As the substituents in $R^{11}$ to $R^{18}$ and $R^{a1}$ in General Formulae (2a), (2b), and (2b-z), it is possible to preferably apply the description of the respective substituents in $R^1$ to $R^8$ and $R^a$ in General Formulae (1a) and (1b).

In addition, $m^1$, $n^1$, and $X^1$ in General Formula (2b) are identical to m, n, and X in General Formula (1b).

The anionic polymerization may be initiated using any step of a crushing step using a ball mill in the preparation of the composition, a heating step separated from the preparation of the composition, and a step of heating a coating of the composition, and the reaction is preferably completed (curing) in a state of a solid electrolyte-containing sheet described below.

Regarding the polymerization conditions of the compound having an anionic polymerizable functional group, it is possible to use conditions that are normally used in anionic polymerization. For example, from the viewpoint of completing the anionic polymerization, the reaction temperature is preferably 50° C. to 180° C. and more preferably 80° C. to 150° C., and the reaction time is preferably five minutes to three hours and more preferably 10 minutes to one hour.

Specific preferred examples of the anionic polymer that is used in the present invention include anionic polymers having the following structural unit, but the present invention is not interpreted to be limited thereto. Here, numerical values in parentheses represent mass ratios.

(b'-1)

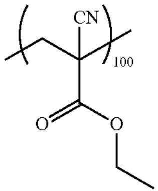

(b'-2)

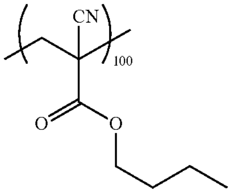

-continued (b'-3)

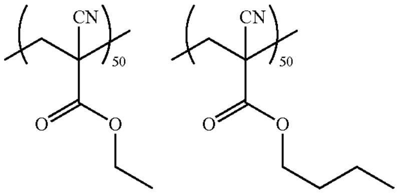

(b'-4)

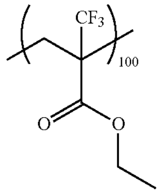

(b'-5)

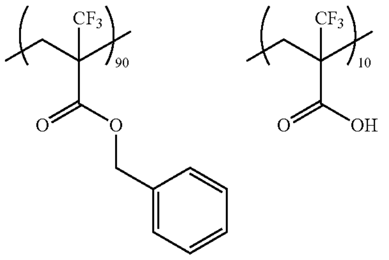

(b'-6)

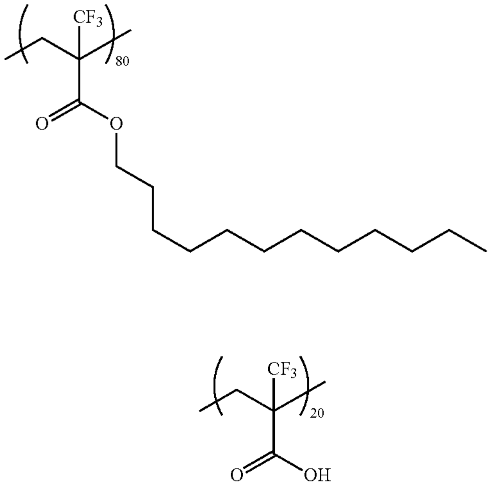

(b'-7)

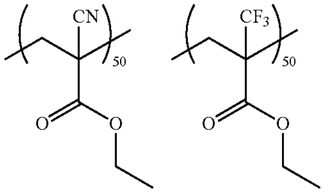

-continued (b'-8)

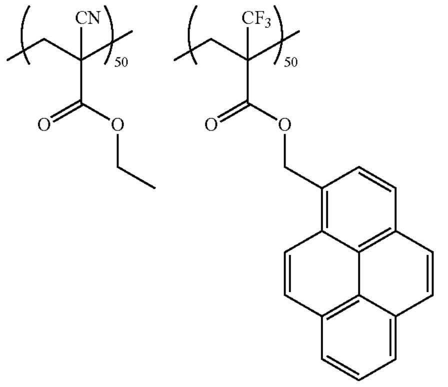

(b'-9)

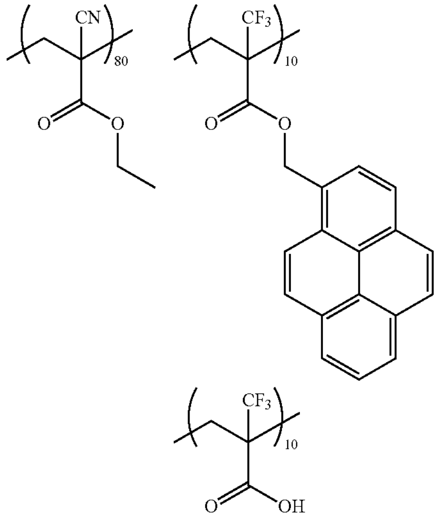

(b'-10)

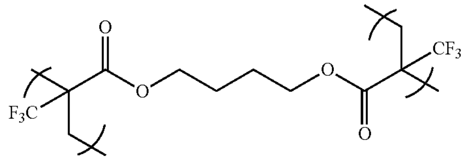

(b'-11)

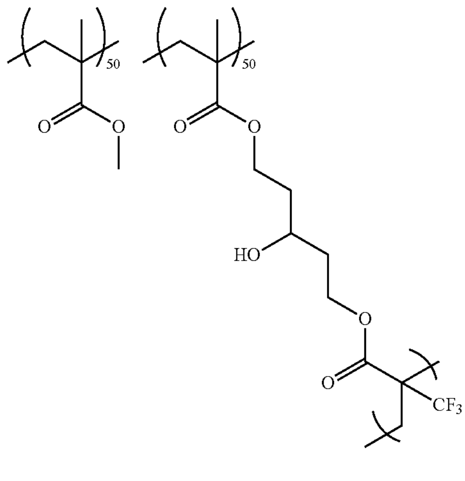

[Solid Electrolyte-Containing Sheet]

A solid electrolyte-containing sheet of the present invention contains an inorganic solid electrolyte having a conductivity for ions of metals belonging to Group I or II of the periodic table and the anionic polymer which bonds to the inorganic solid electrolyte and has a specific repeating unit.

The anionic polymer is preferably an anionic polymer having the repeating unit represented by General Formula (2A) or (2B) and more preferably an anionic polymer having the repeating unit represented by General Formula (2a) or (2b).

From the compound having two or more anionic polymerizable functional groups represented by General Formula (1B) or the compound having an anionic polymerizable functional group represented by General Formula (1b) which has two or more anionic polymerizable groups in one molecule, an anionic polymer having the repeating unit represented by General Formula (2B) or General Formula (2b) having a crosslinked net-like structure is formed due to the progress of the anionic polymerization reaction.

One or more kinds of the anionic polymers may be included. In this case, the proportion of a repeating unit containing a cyano group in an anionic polymerizable functional group-derived repeating unit represented by General Formula (2A) or (2B) and in an anionic polymerizable functional group-derived repeating unit represented by General Formula (2a) or (2b-z) is preferably 0% to less than 2% by mass or more than 30% by mass and 100% by mass or less and more preferably more than 30% by mass and 100% by mass or less.

Here, the repeating unit containing a cyano group refers to a repeating unit in which $R^{11A}$ and/or $R^{12A}$ in General Formula (2A) have a cyano group, a repeating unit in which $R^{13B}$ and/or $R^{14B}$ in General Formula (2B) have a cyano group, a repeating unit in which $R^{11}$ and/or $R^{12}$ in General Formula (2a) have a cyano group, and a repeating unit in which $R^{13}$ and/or $R^{14}$ in General Formula (2b-z) have a cyano group.

In addition, the solid electrolyte-containing sheet of the present invention may also contain other functional additives.

In a case in which the satisfaction of both the reduction of the interface resistance and the battery characteristic-maintaining effect (the improvement of the cycle characteristics) is taken into account, the content of the anionic polymer in the solid electrolyte-containing sheet is preferably less than 5% by mass, more preferably less than 3% by mass, still more preferably less than 2% by mass, particularly preferably less than 1.5% by mass, and most preferably less than 1.2% by mass with respect to a solid content of 100% by mass. The lower limit is not particularly limited, but is preferably 0.1% by mass or more.

[Sheet for All-Solid State Secondary Battery]

The solid electrolyte-containing sheet of the present invention can be preferably used in all-solid state secondary batteries and is modified in a variety of aspects depending on the uses. Examples thereof include a sheet that is preferably used in a solid electrolyte layer (also referred to as a solid electrolyte sheet for an all-solid state secondary battery), a sheet that is preferably used in an electrode or a laminate of an electrode and a solid electrolyte layer (an electrode sheet for an all-solid state secondary battery), and the like. In the present invention, a variety of sheets described above will be collectively referred to as a sheet for an all-solid state secondary battery in some cases.

The sheet for an all-solid state secondary battery is a sheet having a solid electrolyte layer or an active material layer (electrode layer) on a base material. This sheet for an all-solid state secondary battery may further have other layers as long as the sheet has the base material and the solid electrolyte layer or the active material layer, but a sheet having an active material layer is classified into an electrode sheet for an all-solid state secondary battery described below. Examples of other layers include a protective layer, a collector, a coating layer (a collector, a solid electrolyte layer, or an active material layer), and the like.

Examples of the solid electrolyte sheet for an all-solid state secondary battery include a sheet having a solid electrolyte layer and a protective layer on a base material in this order.

The base material is not particularly limited as long as the base material is capable of supporting the solid electrolyte layer, and examples thereof include sheet bodies (plate-like bodies) of materials, organic materials, inorganic materials, and the like described in the below-described section of the collector. Examples of the organic materials include a variety of polymers and the like, and specific examples thereof include polyethylene terephthalate, polypropylene, polyethylene, cellulose, and the like. Examples of the inorganic materials include glass, ceramic, and the like.

The constitution and the layer thickness of the solid electrolyte layer in the sheet for an all-solid state secondary battery are identical to the constitution and the layer thickness of the solid electrolyte layer described in the following section of an all-solid state secondary battery of the present invention.

This sheet is obtained by forming a film of the solid electrolyte composition of the present invention (by means of application and drying) on the base material (possibly, through other layers) and forming a solid electrolyte layer on the base material.

Here, the solid electrolyte composition of the present invention can be prepared using the above-described method.

An electrode sheet for an all-solid state secondary battery of the present invention (also simply referred to as "the electrode sheet of the present invention") is an electrode sheet having an active material layer on a metal foil as a collector for forming an active material layer in an all-solid state secondary battery of the present invention. This electrode sheet is generally a sheet having a collector and an active material layer, and an aspect of having a collector, an active material layer, and a solid electrolyte layer in this order and an aspect of having a collector, an active material layer, a solid electrolyte layer, and an active material layer in this order are also considered as the electrode sheet.

The constitution and the layer thicknesses of the respective layers constituting the electrode sheet are identical to the constitution and the layer thicknesses of individual layers described in the following section of an all-solid state secondary battery of the present invention.

The electrode sheet is obtained by forming a film of the solid electrolyte composition of the present invention which contains the active material (by means of application and drying) on the metal foil and forming an active material layer on the metal foil. A method for preparing the solid electrolyte composition containing an active material is identical to the method for preparing the solid electrolyte composition except for the fact that the active material is used.

Regarding the active material layer and/or the solid electrolyte layer formed of the solid electrolyte composition of the present invention, the kinds and contents of the components are preferably identical to those in the solid content of the solid electrolyte composition except for the fact that the compound having an anionic polymerizable functional group is replaced by the anionic polymer.

[All-Solid State Secondary Battery]

An all-solid state secondary battery of the present invention has a positive electrode, a negative electrode facing the positive electrode, and a solid electrolyte layer between the positive electrode and the negative electrode. The positive electrode has a positive electrode active material layer on a positive electrode collector. The negative electrode has a negative electrode active material layer on a negative electrode collector.

At least one layer of the negative electrode active material layer, the positive electrode active material layer, or the solid electrolyte layer is preferably formed of the solid electrolyte composition of the present invention. Among them, the negative electrode active material layer and/or the positive electrode active material layer is more preferably formed of the solid electrolyte composition of the present invention, and the positive electrode active material layer is still more preferably formed of the solid electrolyte composition of the present invention.

The kinds and the content ratio of the components of the active material layers and/or the solid electrolyte layer formed of the solid electrolyte composition are preferably identical to those in the solid content of the solid electrolyte composition.

Hereinafter, a preferred embodiment of the present invention will be described, but the present invention is not limited thereto.

FIG. 1 is a cross-sectional view schematically illustrating an all-solid state secondary battery (lithium ion secondary battery) according to the preferred embodiment of the present invention. In the case of being seen from the negative electrode side, an all-solid state secondary battery 10 of the present embodiment has a structure in which a negative electrode collector 1, a negative electrode active material layer 2, a solid electrolyte layer 3, a positive electrode active material layer 4, and a positive electrode collector 5 are laminated in this order, and adjacent layers are in direct contact with each other. In a case in which the above-described structure is employed, during charging, electrons ($e^-$) are supplied to the negative electrode side, and lithium ions ($Li^+$) are accumulated thereon. On the other hand, during discharging, the lithium ions ($Li^+$) accumulated on the negative electrode return to the positive electrode side, and electrons can be supplied to an operation portion 6. In the example of the all-solid state secondary battery illustrated in the drawing, an electric bulb is employed as a model of the operation portion 6 and is lit by discharging.

[Positive Electrode Active Material Layer, Solid Electrolyte Layer, and Negative Electrode Active Material Layer]

In the all-solid state secondary battery 10, at least one of the positive electrode active material layer, the solid electrolyte layer, or the negative electrode active material layer is formed of the solid electrolyte composition of the present invention.

That is, the solid electrolyte layer 3 is formed of the solid electrolyte composition of the present invention, the solid electrolyte layer 3 includes the inorganic solid electrolyte and the anionic polymer. The solid electrolyte layer, generally, does not include any positive electrode active material and/or any negative electrode active material. In the solid electrolyte layer 3, it is considered that the anionic polymer chemically bonded to the inorganic solid electrolyte at the terminal is present between the solid particles of the active materials and the like in the inorganic solid electrolyte and the adjacent active material layers. Therefore, the interface resistance between solid particles is reduced, and the bonding property is enhanced.

In a case in which the positive electrode active material layer 4 and/or the negative electrode active material layer 2 are formed of the solid electrolyte composition of the present invention, the positive electrode active material layer 4 and the negative electrode active material layer 2 respectively include a positive electrode active material or a negative electrode active material and further include the inorganic solid electrolyte and the anionic polymer. In a case in which the active material layers contain the inorganic solid electrolyte, it is possible to improve the ion conductivity. In the active material layers, it is considered that the anionic polymer chemically bonded to the inorganic solid electrolyte at the terminal is present between solid particles. Therefore, the interface resistance between solid particles is reduced, and the bonding property is enhanced.

The kinds of the inorganic solid electrolytes and the anionic polymers that the positive electrode active material layer 4, the solid electrolyte layer 3, and the negative electrode active material layer 2 contain may be identical to or different from each other.

In the present invention, there are cases in which any or both of the positive electrode active material layer and the negative electrode active material layer will be simply referred to as the active material layer or the electrode active material layer. In addition, there are cases in which any or both of the positive electrode active material and the negative electrode active material will be simply referred to as the active material or the electrode active material.

In the present invention, any layer of the negative electrode active material layer, the positive electrode active material layer, and the solid electrolyte layer in the all-solid state secondary battery is produced using the solid electrolyte composition containing the solid particles of the compound having an anionic polymerizable functional group, the inorganic solid electrolyte, and the like. Therefore, it is possible to improve the bonding property between solid particles, and consequently, favorable cycle characteristics of the all-solid state secondary battery can also be realized.

The action and mechanism thereof are not clear but are considered as follows.

That is, it is considered that the anionic functional groups present on the surfaces of the solid particles of the inorganic solid electrolyte and the like act as an anionic polymerization initiating species, whereby an active species in which covalent bonds are formed between the solid particles and the compound having an anionic polymerizable functional group is generated, and then the compound having an anionic polymerizable functional group dispersed between the solid particles reacts with the active species, and anionic polymerization proceeds, whereby an anionic polymer is formed. It is considered that the formed anionic polymer chemically bonds to the surfaces of the solid particles of the inorganic solid electrolyte and the like at the terminal and is present so as to fill voids between the solid particles, and thus a strong bonding property between the solid particles develops. Therefore, it is considered that the all-solid state secondary battery of the present invention exhibits a more favorable bonding property than the bonding property in a case in which solid particles are dispersed in a polymer that has been provided with a large molecular weight in advance or a case in which a radical polymerization polymer is formed by the progress of the radical polymerization of a composition containing a radical polymerizable monomer and solid particles.

In addition, with respect to the repetition of charging and discharging, it is considered that the contact between the solid particles is maintained due to the covalent bonds formed between the surfaces of the solid particles of the inorganic solid electrolyte and the like and the anionic polymer and an increase in the interface resistance between the solid particles is suppressed. Therefore, it is considered that the all-solid state secondary battery of the present invention exhibits excellent cycle characteristics. Particularly, in a case in which the particles of an active material that expands or contracts due to charging and discharging are included, it is considered that an increase in the interface resistance between the solid particles is more effectively suppressed, and the all-solid state secondary battery exhibits more favorable cycle characteristics.

The thicknesses of the positive electrode active material layer 4, the solid electrolyte layer 3, and the negative electrode active material layer 2 are not particularly limited. In a case in which the dimensions of ordinary batteries are taken into account, the thicknesses of the respective layers are preferably 10 to 1,000 μm and more preferably 20 μm or more and less than 500 μm. In the all-solid state secondary battery of the present invention, the thickness of at least one layer of the positive electrode active material layer 4, the solid electrolyte layer 3, or the negative electrode active material layer 2 is still more preferably 50 μm or more and less than 500 μm.

[Collector (Metal Foil)]

The positive electrode collector 5 and the negative electrode collector 1 are preferably an electron conductor.

In the present invention, there are cases in which any or both of the positive electrode collector and the negative electrode collector will be simply referred to as the collector.

As a material forming the positive electrode collector, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and, among these, aluminum and an aluminum alloy are more preferred.

As a material forming the negative electrode collector, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 to 500 μm. In addition, the surface of the collector is preferably provided with protrusions and recesses by means of a surface treatment.

In the present invention, a functional layer, member, or the like may be appropriately interposed or disposed between the respective layers of the negative electrode collector, the negative electrode active material layer, the solid electrolyte layer, the positive electrode active material layer, and the positive electrode collector or on the outside thereof. In addition, the respective layers may be constituted of a single layer or multiple layers.

[Chassis]

It is possible to produce the basic structure of the all-solid state secondary battery by disposing the respective layers described above. Depending on the use, the basic structure may be directly used as an all-solid state secondary battery, but the basic structure may be used after being enclosed in an appropriate chassis in order to have a dry battery form. The chassis may be a metallic chassis or a resin (plastic) chassis. In a case in which a metallic chassis is used, examples thereof include an aluminum alloy chassis and a stainless-steel chassis. The metallic chassis is preferably classified into a positive electrode-side chassis and a negative electrode-side chassis and electrically connected to the positive electrode collector and the negative electrode collector respectively. The positive electrode-side chassis and the negative electrode-side chassis are preferably integrated by being joined together through a gasket for short circuit prevention.

[Manufacturing of Solid Electrolyte-Containing Sheet]

In the present invention, the solid electrolyte-containing sheet containing the inorganic solid electrolyte and the anionic polymer is formed by curing a coating containing the inorganic solid electrolyte and the compound having an anionic polymerizable functional group through the progress of anionic polymerization. The inorganic solid electrolyte that acts as an anionic polymerization initiator bonds to the polymer terminal of the anionic polymer.

From the above-described viewpoint, as a method for manufacturing a solid electrolyte-containing sheet of the present invention, a first aspect and a second aspect described below are preferably exemplified.

i) First Aspect

A method for manufacturing a solid electrolyte-containing sheet including a step (1α) of applying the solid electrolyte composition of the present invention onto a base material to form a coating, and a step (1β) of curing the formed coating through the progress of anionic polymerization.

ii) Second Aspect

A method for manufacturing a solid electrolyte-containing sheet including a step (2γ) of dispersing an inorganic solid electrolyte in the presence of a dispersion medium so as to produce a slurry, a step (2δ) of applying the obtained slurry onto a base material to form a coating, a step (2α) of applying a solution of a compound having an anionic polymerizable functional group onto the formed coating and infusing the solution into the coating so as to form a sheet, and a step (2β) of curing the formed sheet through the progress of anionic polymerization.

Hereinafter, the respective steps will be described in detail.

It is preferable that the anionic polymerization in the steps (1β) and (2β) slowly proceeds even at room temperature, but is accelerated by heating. The progress of the anionic polymerization makes the coating containing the inorganic solid electrolyte and the compound having an anionic polymerizable functional group become a gel, and the additional progress of the anionic polymerization cures the coating.

Here, the curing refers to the fact that, due to the sufficient progress of the anionic polymerization, the coating is cured from a gel to a cured substance.

In a case in which the anionic polymerization is caused to proceed by heating, the temperature is preferably 50° C. to 180° C. and more preferably 80° C. to 150° C., and the heating time is preferably five minutes to three hours and more preferably 10 minutes to one hour. Due to this heating step, the coating and/or the sheet are dried at the same time as the progress of the anionic polymerization, and the solid electrolyte-containing sheet from which a solvent component such as the dispersion medium is removed is obtained. In a case in which the anionic polymerization is caused to proceed from room temperature, separately, a step of removing the solvent component such as the dispersion medium is required.

The second aspect is a manufacturing method in which the compound having an anionic polymerizable functional group is infused into and brought into contact with voids between the inorganic solid electrolyte particles formed in the steps (2γ) and (2δ) and then the sheet is cured through the progress of the anionic polymerization. With this aspect, it is possible to fill only gaps (spaces in which the active materials and/or the inorganic solid electrolyte are not present) that are also included in the solid electrolyte-containing sheet without affecting an inorganic contact interface which the active materials and/or the inorganic solid electrolyte are in contact with, and thus it is possible to exhibit a strong bonding property without impairing ion conduction.

As the inorganic solid electrolyte and the dispersion medium in the step (2γ), it is possible to preferably apply the inorganic solid electrolyte and the dispersion medium described in the above-described section of the solid electrolyte composition. In addition, as the conditions for the production of the slurry in the step (2γ), it is possible to preferably apply the conditions for the production of the slurry described in the above-described section of the preparation of a solid electrolyte composition.

The content of the inorganic solid electrolyte in the slurry is preferably 50% to 95% by mass, more preferably 5% to 90% by mass, and still more preferably 60% to 90% by mass.

In the step (2γ), as components other than the inorganic solid electrolyte, the above-described components such as the active materials, the particle dispersant, and the binder (here, the compound having an anionic polymerizable functional group is excluded) are also preferably turned into a slurry in the presence of the dispersion medium. In this case, as the contents of the respective components in the slurry, it is possible to preferably apply the contents thereof in the solid electrolyte composition. In addition, regarding the step of the preparation of the slurry, it is possible to apply the description of the preparation of the solid electrolyte composition. That is, in a case in which the slurry obtained in the step (2γ) contains the compound having an anionic polymerizable functional group, the step (2γ) includes the step (a1) and the step (b1) in the preparation of the solid electrolyte composition.

The manufacturing method preferably further includes a step of drying the coating after the formation of the coating in the step (2δ). Regarding the drying step, while it is possible to appropriately adjust the conditions using the dispersion medium or the like, and, for example, the coating is preferably dried at 50° C. to 180° C. for one minute to one hour. In addition, the coating is preferably dried by being left to stand.

The thickness of the coating formed in the step (2δ) is not particularly limited, but is preferably adjusted to be 20 μm to 500 μm in the step of infusing the solution in the step (2α).

The solution of the compound having an anionic polymerizable functional group in the step (2α) refers to a solution obtained by dissolving at least the compound having an anionic polymerizable functional group in a solvent. The solvent is not particularly limited as long as the solvent is capable of dissolving the compound having an anionic polymerizable functional group, but the dispersion medium described in the section of the solid electrolyte composition can be preferably applied. Meanwhile, as components other than the compound having an anionic polymerizable functional group, components such as such as the active materials, the particle dispersant, and the binder may also be included.

The concentration of the solution of the compound having an anionic polymerizable functional group in the step (2α) is not limited as long as voids between the inorganic solid electrolyte particles formed in the steps (2γ) and (2δ) are infused with the solution, but is preferably 1% by mass to 10% by mass.

With the above-described aspect, it is possible to produce a solid electrolyte-containing sheet which is a sheet of a base material and a solid electrolyte layer.

Additionally, regarding steps such as application, it is possible to use a method described in the following section of the manufacturing of an all-solid state secondary battery.

[All-Solid State Secondary Battery and Manufacturing of Electrode Sheet for All-Solid State Secondary Battery]

The all-solid state secondary battery and the electrode sheet for an all-solid state secondary battery can be manufactured using the above-described method for manufacturing the solid electrolyte-containing sheet.

That is, in a case in which the solid electrolyte composition of the present invention contains an active material, in the step (1α) and the step (2δ), the solid electrolyte composition is preferably applied onto a collector not the base material. In this case, it is possible to produce the electrode sheet for an all-solid state secondary battery which is a sheet containing a solid electrolyte layer and an active material layer.

In addition, the all-solid state secondary battery can be manufactured using an ordinary method except for the fact that the method for manufacturing a solid electrolyte-containing sheet is included. Specifically, the all-solid state secondary battery and the electrode sheet for an all-solid state secondary battery can be manufactured by forming the respective layers described above using the solid electrolyte composition of the present invention or the like. Meanwhile, any layer of the positive electrode active material layer, the solid electrolyte layer, and the negative electrode active material layer may be produced using the method for manufacturing a solid electrolyte-containing sheet, and other layers may be produced using a solid electrolyte composition which is not the present invention and an ordinary method. Hereinafter, the all-solid state secondary battery and the manufacturing of the electrode sheet for an all-solid state secondary battery will be described in detail.

The all-solid state secondary battery of the present invention can be manufactured using a method including (through) a step of applying the solid electrolyte composition of the present invention onto a metal foil which serves as a collector and forming a coating (film manufacturing).

For example, a solid electrolyte composition containing a positive electrode active material is applied as a material for a positive electrode (a composition for a positive electrode layer) onto a metal foil which is a positive electrode collector so as to form a positive electrode active material layer, thereby producing a positive electrode sheet for an all-solid state secondary battery. Next, a solid electrolyte composition for forming a solid electrolyte layer is applied onto the positive electrode active material layer so as to form a solid electrolyte layer. Furthermore, a solid electrolyte composition containing a negative electrode active material is applied as a material for a negative electrode (a composition for a negative electrode layer) onto the solid electrolyte layer so as to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can be produced by enclosing the all-solid state secondary battery in a chassis as necessary.

In addition, it is also possible to manufacture an all-solid state secondary battery by carrying out the methods for forming the respective layers in a reverse order so as to form a negative electrode active material layer, a solid electrolyte layer, and a positive electrode active material layer on a negative electrode collector and overlaying a positive electrode collector thereon.

As another method, the following method can be exemplified. That is, a positive electrode sheet for an all-solid state secondary battery is produced as described above. In addition, a solid electrolyte composition containing a negative electrode active material is applied as a material for a negative electrode (a composition for a negative electrode layer) onto a metal foil which is a negative electrode collector so as to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer so that the solid electrolyte layer and the active material layer come into contact with each other. An all-solid state secondary battery can be manufactured as described above.

As still another method, the following method can be exemplified. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, a solid electrolyte composition is applied onto a base material, thereby producing a solid electrolyte sheet for an all-solid state secondary battery consisting of a solid electrolyte layer. Furthermore, the positive electrode sheet for an all-solid state secondary battery and the negative electrode sheet for an all-solid state secondary battery are laminated together so as to sandwich the solid electrolyte layer that has been peeled off from the base material. An all-solid state secondary battery can be manufactured as described above.

An all-solid state secondary battery can be manufactured by combining the above-described forming methods. For example, a positive electrode sheet for an all-solid state secondary battery, a negative electrode sheet for an all-solid state secondary battery, and a solid electrolyte sheet for an all-solid state secondary battery are produced respectively. Next, a solid electrolyte layer peeled off from a base material is laminated on the negative electrode sheet for an all-solid state secondary battery and is then attached to the positive electrode sheet for an all-solid state secondary battery, whereby an all-solid state secondary battery can be manufactured. In this method, it is also possible to laminate the solid electrolyte layer on the positive electrode sheet for an all-solid state secondary battery and attach the solid electrolyte layer to the negative electrode sheet for an all-solid state secondary battery.

(Formation of Individual Layers (Film Formation))

The method for applying the solid electrolyte composition is not particularly limited and can be appropriately selected. Examples thereof include coating (preferably wet-type coating), spray coating, spin coating, dip coat coating, slit coating, stripe coating, and bar coating.

At this time, the solid electrolyte composition may be dried after being applied or may be dried after being applied to multiple layers. The drying temperature is not particularly limited. The lower limit is preferably 30° C. or higher, more preferably 60° C. or higher, and still more preferably 80° C. or higher, and the upper limit is preferably 300° C. or lower, more preferably 250° C. or lower, and still more preferably 200° C. or lower. In a case in which the compositions are heated in the above-described temperature range, it is possible to remove the dispersion medium and form a solid state. In addition, the temperature is not excessively increased, and the respective members of the all-solid state secondary battery are not impaired, which is preferable. Therefore, in the all-solid state secondary battery, excellent total performance is exhibited, and it is possible to obtain a favorable bonding property.

After the application of the solid electrolyte composition or the production of the all-solid state secondary battery, the respective layers or the all-solid state secondary battery is preferably pressurized. In addition, the respective layers are also preferably pressurized in a state of being laminated together. Examples of the pressurization method include a hydraulic cylinder pressing machine and the like. The welding pressure is not particularly limited, but is, generally, preferably in a range of 50 to 1,500 MPa.

In addition, the applied solid electrolyte composition may be heated at the same time as pressurization. The heating temperature is not particularly limited, but is generally in a range of 30° C. to 300° C. The respective layers or the all-solid state secondary battery can also be pressed at a temperature higher than the glass transition temperature of the inorganic solid electrolyte.

The pressurization may be carried out in a state in which the applied solvent or dispersion medium has been dried in advance or in a state in which the solvent or the dispersion medium remains.

Meanwhile, the respective compositions may be applied at the same time, and the application, the drying, and the pressing may be carried out simultaneously and/or sequentially. The respective compositions may be applied to separate base materials and then laminated by means of transfer.

The atmosphere during the pressurization is not particularly limited and may be any one of in the atmosphere, under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure can be changed depending on the area or film thickness of the portion under pressure. In addition, it is also possible to apply different pressures to the same portion.

A pressing surface may be flat or roughened.

(Initialization)

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Uses of All-Solid State Secondary Battery]

The all-solid state secondary battery of the present invention can be applied to a variety of uses. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, memory cards, portable tape recorders, radios, backup power supplies, and the like. Additionally, examples of consumer uses include automobiles, electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military uses or universe uses. In addition, the all-solid state secondary battery can also be combined with solar batteries.

Among these, the all-solid state secondary battery is preferably applied to applications for which a high capacity and high-rate discharging characteristics are required. For example, in electricity storage facilities in which an increase in the capacity is expected in the future, it is necessary to satisfy both high safety, which is essential, and furthermore, the battery performance In addition, in electric vehicles mounting high-capacity secondary batteries and domestic uses in which batteries are charged out every day, better safety is required against overcharging. According to the present invention, it is possible to preferably cope with the above-described use aspects and exhibit excellent effects.

All-solid state secondary batteries refer to secondary batteries having a positive electrode, a negative electrode, and an electrolyte which are all constituted of solid. In other words, all-solid state secondary batteries are differentiated from electrolytic solution-type secondary batteries in which a carbonate-based solvent is used as an electrolyte. Among these, the present invention is assumed to be an inorganic all-solid state secondary battery. All-solid state secondary batteries are classified into organic (polymer) all-solid state secondary batteries in which a polymer compound such as polyethylene oxide is used as an electrolyte and inorganic all-solid state secondary batteries in which the Li—P—S-based glass, LLT, LLZ, and the like is used. Meanwhile, the application of polymer compounds to inorganic all-solid state secondary batteries is not inhibited, and polymer compounds can also be applied as binder particles of positive electrode active materials, negative electrode active materials, and/or inorganic solid electrolyte particles.

Inorganic solid electrolytes are differentiated from electrolytes in which the above-described polymer compound such as polyethylene oxide is used as an ion conductive medium (polymer electrolyte), and inorganic compounds serve as ion conductive media. Specific examples thereof include the Li—P—S-based glass, LLT, and LLZ. Inorganic solid electrolytes do not emit positive ions (Li ions) and exhibit an ion transportation function. In contrast, there are cases in which materials serving as an ion supply source which is added to electrolytic solutions or solid electrolyte layers and emits positive ions (Li ions) are referred to as electrolytes; however, in the case of being differentiated from electrolytes as the ion transportation materials, the materials are referred to as "electrolyte salts" or "supporting electrolytes". Examples of the electrolyte salts include lithium bistrifluoromethanesulfonylimide (LiTFSI).

In the case of being referred to as a "composition" in the present invention, the "composition" refers to a mixture obtained by uniformly mixing two or more components. Here, the composition needs to substantially maintain uniformity and may partially include agglomeration or uneven distribution as long as the compositions exhibit desired effects. In addition, particularly, in the case of being referred to as a solid electrolyte composition, the solid electrolyte composition basically refers to a composition (typically having a paste form) which serves as a material for forming the solid electrolyte layer or the like, and an electrolyte layer or the like formed by curing the above-described composition is not considered as the solid electrolyte composition.

EXAMPLES

Hereinafter, the present invention will be described in more detail on the basis of examples. Meanwhile, the present invention is not interpreted to be limited thereto. In the following examples, "parts" and "%" indicating compositions are mass-based unless particularly otherwise described. In addition, "room temperature" refers to 25° C.

(Synthesis of Sulfide-Based Inorganic Solid Electrolytes LPS)

In a glove box under an argon atmosphere (dew point: −70° C.), lithium sulfide ($Li_2S$, manufactured by Sigma-Aldrich Purity: >99.98%) (2.42 g) and diphosphorus pentasulfide ($P_2S_5$, manufactured by Sigma-Aldrich Purity: >99%) (3.90 g) were weighed respectively, injected into an agate mortar, and mixed together using an agate muddler for five minutes. The mixing ratio between $Li_2S$ and $P_2S_5$ was set to 75:25 ($Li_2S$:$P_2S_5$) in terms of the molar ratio.

Zirconia beads (66 g) having a diameter of 5 mm were injected into a 45 mL zirconia container (manufactured by Fritsch Japan Co., Ltd.), the full amount of a mixture of the lithium sulfide and the diphosphorus pentasulfide was injected thereinto, and the container was completely sealed under the argon atmosphere. The container was set in a planetary ball mill P-7 (trade name, manufactured by Fritsch Japan Co., Ltd.) manufactured by Fritsch Japan Co., Ltd., mechanical milling was carried out at a temperature of 25° C. and a rotation speed of 510 rpm for 20 hours, thereby obtaining yellow powder of a sulfide-based inorganic solid electrolyte (Li—P—S glass; in some cases, referred to as LPS) (6.20 g).

Example 1

<Preparation Example of Solid Electrolyte Composition>

One hundred eighty zirconia beads having a diameter of 5 mm were injected into a 45 mL zirconia container (manufactured by Fritsch Japan Co., Ltd.), the inorganic solid electrolyte (9.0 g) and a dispersion medium (18 g) were injected thereinto, then, the container was set in a planetary ball mill P-7 manufactured by Fritsch Japan Co., Ltd., and the components were mixed together at a rotation speed of 300 rpm for two hours. An additive (0.36 g) was added thereto, the components were further continuously mixed together at a rotation speed of 150 rpm for five minutes, thereby preparing each of solid electrolyte compositions S-1 to S-10, T-1, and T-2.

Meanwhile, in a case in which the solid electrolyte composition contained an active material, the active material was injected and mixed at the same timing as the injection of the additive, thereby preparing the solid electrolyte composition.

In addition, the solid electrolyte composition T-2 was prepared by injecting and mixing PERHEXYL D (a thermal radical polymerization initiator, manufactured by NOF Corporation) (0.036 g) (not shown in the tables) at the same timing as the injection of the active material.

<Preparation Example of Solid Electrolyte Composition Containing Particle Dispersant>

One hundred eighty zirconia beads having a diameter of 5 mm were injected into a 45 mL zirconia container (manufactured by Fritsch Japan Co., Ltd.), the inorganic solid electrolyte (9.0 g), a particle dispersant (0.18 g), and a dispersion medium (18 g) were injected thereinto, then, the container was set in a planetary ball mill P-7 manufactured by Fritsch Japan Co., Ltd., and the components were mixed together at a rotation speed of 300 rpm for two hours. An additive (0.36 g) was added thereto, the components were further continuously mixed together at a rotation speed of 150 rpm for five minutes, thereby preparing each of solid electrolyte compositions S-11 and S-12.

Meanwhile, the active material was injected and mixed at the same timing as the injection of the additive, thereby preparing the solid electrolyte composition.

The components of each of the solid electrolyte compositions and the mass fractions thereof blended are shown in Table 1.

TABLE 1

| No. | Inorganic solid electrolyte 50 parts by mass | Additive*1 2 parts by mass | Particle dispersant 1 part by mass | Positive electrode active material 80 parts by mass | Negative electrode active material 60 parts by mass | Dispersion medium 100 parts by mass |
|---|---|---|---|---|---|---|
| S-1 | LLT | B-1 | — | — | — | Xylene |
| S-2 | LPS | B-1 | — | — | — | Xylene |
| S-3 | LLZ | B-1 | — | LCO | — | Xylene |
| S-4 | LPS | B-1:B-2(=1:1)*2 | — | LCO | — | Xylene |
| S-5 | LPS | B-1:B-2(=1:2)*2 | — | LCO | — | Octane |

TABLE 1-continued

| No. | Inorganic solid electrolyte 50 parts by mass | Additive*[1] 2 parts by mass | Particle dispersant 1 part by mass | Positive electrode active material 80 parts by mass | Negative electrode active material 60 parts by mass | Dispersion medium 100 parts by mass |
|---|---|---|---|---|---|---|
| S-6 | LPS | B-1 | — | NCA | — | Mesitylene |
| S-7 | LPS | B-1 | — | — | Graphite | Mesitylene |
| S-8 | LPS | B-2 | — | LCO | — | Octane |
| S-9 | LPS | B-3 | — | LCO | — | Mesitylene |
| S-10 | LPS | B-4 | — | LCO | — | Decane |
| S-11 | LPS | B-1 | E-1 | LCO | — | Octane |
| S-12 | LPS | B-1 | E-2 | — | Graphite | Octane |
| T-1 | LPS | Polybutadiene-acrylonitrile (cyano group-containing polymer) | — | LCO | — | Toluene |
| T-2 | LPS | Methyl methacrylate (radical polymerizable monomer) | — | LCO | — | Toluene |

<Note of Table>

LLT: $Li_{0.5}La_{0.5}TiO_3$ (manufactured by Toshima Manufacturing Co., Ltd.)

LPS: Li—P—S-based glass synthesized above

LLZ: $Li_7La_3Zr_2O_{12}$

LCO: $LiCoO_2$ (lithium cobalt oxide)

NCA: $LiNi_{0.85}Co_{0.10}Al_{0.05}O_2$ (lithium nickel cobalt aluminum oxide)

B-1: Ethyl 2-cyanoacrylate

B-2: Butyl 2-trifluoromethylacrylate

B-3: Diethyl 2-methylenemalonate

B-4: Bis(2-trifluoromethylacrylic acid)-1,4-butanediyl

E-1: Acrylic acid

E-2: (2-pyrenyl)methyl acrylate

Polybutadiene-acrylonitrile copolymer: manufactured by Zeon Corporation, copolymerization ratio (mass ratio) (butadiene:acrylonitrile = 71.0:29.0), Mw: 120.000; meanwhile, in the table, "copolymers" are not shown.

"—": This reference sign indicates that the corresponding component is not contained.

*[1]A compound having an anionic polymerizable functional group, a binder, and a radical polymerizable monomer are expressed as an additive.

*[2]Two kinds of additives were added in a mass ratio shown in a parenthesis.

<Production of Solid Electrolyte-Containing Sheet>

1) Ordinary Coating Method

The solid electrolyte composition prepared above was applied onto a stainless steel (SUS) foil which was a collector.

The solid electrolyte composition was cured by carrying out polymerization (curing treatment) at a temperature for a time which are shown in Table 2, was heated at 120° C. for 10 minutes so as to dry the solid electrolyte composition, thereby producing each of solid electrolyte-containing sheets Nos. 101 to 112, c11, and c12 having a laminate structure of the solid electrolyte-containing layer and the SUS foil. Here, the thickness of the solid electrolyte-containing layer was 200 μm, and the thickness of the SUS foil was 20 μm.

2) Bilayer Coating Method of Anionic Polymerizable Monomer

The solid electrolyte composition prepared above (1.8 g) was applied onto an SUS foil. After that, the solid electrolyte composition was left to stand at room temperature for one hour so as to dry a coating, thereby forming a 200 μm-thick coating.

Subsequently, a toluene solution of ethyl 2-cyanoacrylate (0.38 g) (5% by mass diluted liquid) was applied onto the coating obtained above and infused into the coating, and anionic polymerization (curing treatment) was caused to proceed at a temperature for a time which are shown in Table 2 so as to cure the composition, thereby drying the respective coatings. Therefore, each of solid electrolyte-containing sheets Nos. 113 and 114 having a laminate structure of the solid electrolyte-containing layer and the SUS foil was produced. Here, the thickness of the solid electrolyte-containing layer was 210 μm, and the thickness of the SUS foil was 20 μm.

Testing Example 1

Bonding Property Test

A 180° peel strength test (JIS Z0237-2009) was carried out on the obtained solid electrolyte-containing sheet.

Pressure-sensitive adhesive tape (width: 24 mm, length: 300 mm) (trade name: CELLOTAPE (registered trademark) CT-24, manufactured by Nichiban Co., Ltd.) was attached to the surface of the solid electrolyte-containing sheet on which the solid electrolyte composition was cured. The tape was folded back 180° by gripping an end of the tape, peeled off 25 mm from the solid electrolyte-containing sheet, then, a single end of a portion of the solid electrolyte-containing sheet from which the pressure-sensitive adhesive tape had been peeled off was fixed to a lower-side jig installed in the following tester, and the pressure-sensitive adhesive tape was fixed to an upper-side jig.

The test was carried out at a loading rate of 300 mm/minute. The pressure-sensitive adhesive tape was peeled off 25 mm after the initiation of measurement, then, for the 25 mm-long pressure-sensitive adhesive tape peeled off from the solid electrolyte-containing sheet, the pressure-sensitive adhesive force was measured every 0.05 mm, and the average of the measurement values was obtained and used as the value of the peeling pressure-sensitive adhesive force (average peel strength (N)).

The average peel strength was evaluated according to the following evaluation standards. Meanwhile, a high average peel strength indicates a stronger bonding force. The evaluation standards of "B" or higher are the passing level of the present test.

The peel strength was measured using a combination of a standard-type digital force gauge ZTS-5N and a vertical electric measurement stand MX2 series (all trade names, manufactured by IMADA Co., Ltd.).

-Evaluation Standards-

A: 2.0 N or more

B: 1.0 N or more and less than 2.0 N

C: 0.5 N or more and less than 1.0 N

D: Less than 0.5 N

TABLE 2

| Test No. | Solid electrolyte composition | Presence and absence of delayer coating | Curing treatment Temperature (° C.) | Curing treatment Time (hours) | Evaluation result Peel strength | Note |
|---|---|---|---|---|---|---|
| 101 | S-1 | — | 60 | 0.5 | A | the invention |
| 102 | S-2 | — | 60 | 0.5 | A | the invention |
| 103 | S-3 | — | 60 | 0.5 | A | the invention |
| 104 | S-4 | — | 80 | 1 | B | the invention |
| 105 | S-5 | — | 80 | 1 | B | the invention |
| 106 | S-6 | — | 60 | 0.5 | A | the invention |
| 107 | S-7 | — | 60 | 0.5 | A | the invention |
| 108 | S-8 | — | 100 | 1 | B | the invention |
| 109 | S-9 | — | 100 | 1 | B | the invention |
| 110 | S-10 | — | 80 | 0.5 | A | the invention |
| 111 | S-11 | — | 80 | 1 | A | the invention |
| 112 | S-12 | — | 80 | 1 | A | the invention |
| 113 | S-3 | ○ | 60 | 0.5 | A | the invention |
| 114 | T-1 | ○ | 60 | 0.5 | B | the invention |
| c11 | T-1 | — | —*1 | —*1 | C | Comparative Example |
| c12 | T-2 | — | 150*2 | 2*2 | D | Comparative Example |

<Note of Table>

*1A cyano group-containing polymer was used, and thus no curing treatment was carried out.

*2The temperature and the time of the curing treatment by radical polymerization The results of Table 2 show that the solid electrolyte-containing sheet of the present invention containing the inorganic solid electrolyte and the specific anionic polymer which was produced using the solid electrolyte composition of the present invention including the inorganic solid electrolyte and the compound having an anionic polymerizable functional group has a strong adhesive force and an excellent bonding property. In addition, solid electrolyte-containing sheets having an excellent bonding property could be produced using the method for manufacturing a solid electrolyte-containing sheet of the present invention.

In contrast, the solid electrolyte-containing sheet No. c11 produced for comparison was a sheet produced in advance using the comparative solid electrolyte composition T-1 containing a cyano group-containing polymer which was a polymer and did not contain the specific anionic polymer. This solid electrolyte-containing sheet No. c11 had a weak adhesive force and an insufficient bonding property. This is considered to be because the dispersibility of the cyano group-containing polymer was poor, and no chemical bonds were formed between the inorganic solid electrolyte and the polymer. In addition, the solid electrolyte-containing sheet No. c12 produced for comparison was a sheet produced in advance using the comparative solid electrolyte composition T-2 containing a radical polymerizable monomer and did not contain the specific anionic polymer. This solid electrolyte-containing sheet No. c12 had a weak adhesive force and an insufficient bonding property. This is considered to be because no chemical bonds were formed between the inorganic solid electrolyte and the radical polymerizable monomer. In addition, the solid electrolyte-containing sheets No. c11 and No. c12 produced without using the method for manufacturing a solid electrolyte-containing sheet of the present invention had a poor bonding property.

<Manufacturing of All-Solid State Secondary Battery>

A disc-shaped piece having a diameter of 14.5 mm was cut out from each of the solid electrolyte-containing sheets produced above, the Li—P—S-based glass synthesized above and a Li foil were combined thereinto as a solid electrolyte layer and a counter electrode, and the sheet was pressurized at 160 MPa. The obtained sheet for an all-solid state secondary battery was put into a 2032-type stainless steel coin case into which a spacer and a washer were combined, thereby producing all-solid state secondary batteries Nos. 201 to 210, c21, and c22.

Test Example 2

Evaluation of Cycle Characteristics

The cycle characteristics of each of the all-solid state secondary batteries produced above were measured using a charge and discharge evaluation device "TOSCAT-3000 (trade name)" manufactured by Toyo System Corporation. The all-solid state secondary battery was charged at a current density of 0.1 $mA/cm^2$ until the battery voltage reached 3.6 V. The all-solid state secondary battery was discharged at a current density of 0.1 $mA/cm^2$ until the battery voltage reached 2.5 V. Three cycles of charging and discharging were repeated under the above-described conditions, thereby carrying out initialization.

Each of the initialized all-solid state secondary batteries was charged at a current density of 0.2 $mA/cm^2$ until the battery voltage reached 4.2 V and then discharged at a current density of 0.2 $mA/cm^2$ until the battery voltage reached 2.5 V. The above-described charging and discharging was considered as one cycle, and the charging and discharging was repeated.

In this charging and discharging cycle, the discharge capacity at the first cycle of this charging and discharging after the initialization was considered as 100%, and the number of cycles repeated until the discharge capacity retention reached less than 80% was evaluated using the following standards. Meanwhile, the evaluation standards of "C" or higher are the passing levels of the present test.

-Evaluation Standards-

A: 30 cycles or more

B: 20 cycles or more and less than 30 cycles

C: 10 cycles or more and less than 20 cycles

D: Less than 10 cycles

TABLE 3

| Test No. | Solid electrolyte-containing sheet (positive electrode) | Solid electro-lyte | Electrode (negative electrode) | Evaluation result Cycle charac-teristics | Note |
|---|---|---|---|---|---|
| 201 | 103(S-3) | Li—P—S | Li foil | A | the invention |
| 202 | 104(S-4) | Li—P—S | Li foil | B | the invention |
| 203 | 105(S-5) | Li—P—S | Li foil | B | the invention |
| 204 | 106(S-6) | Li—P—S | Li foil | A | the invention |
| 205 | 108(S-8) | Li—P—S | Li foil | B | the invention |
| 206 | 109(S-9) | Li—P—S | Li foil | B | the invention |
| 207 | 110(S-10) | Li—P—S | Li foil | A | the invention |
| 208 | 111(S-11) | Li—P—S | Li foil | A | the invention |
| 209 | 113 (S-3* coat*[1]) | Li—P—S | Li foil | A | the invention |
| 210 | 114 (T-1* coat*[1]) | Li—P—S | Li foil | B | the invention |
| c21 | c11(T-1) | Li—P—S | Li foil | D | Comparative Example |
| c22 | c12(T-2) | Li—P—S | Li foil | D | Comparative Example |

<Note of Table>

*[1]This reference sign indicates that the sheets were produced using the bilayer coating method.

The results in Table 3 show that the all-solid state secondary battery of the present invention in which the positive electrode active material layer containing the inorganic solid electrolyte and the specific anionic polymer was formed using the solid electrolyte composition of the present invention including the compound having an anionic polymerizable functional group and the inorganic solid electrolyte had excellent cycle characteristics. As described above, all-solid state secondary batteries manufactured using the solid electrolyte composition of the present invention had a favorable bonding property between solid particles and also had excellent cycle characteristics. In addition, all-solid state secondary batteries having a favorable bonding property between solid particles and excellent cycle characteristics could be manufactured using the method for manufacturing a solid electrolyte-containing sheet of the present invention.

In contrast, in the all-solid state secondary battery No. c21 produced for comparison, the positive electrode layer containing no specific anionic polymer was formed in advance using the comparative solid electrolyte composition T-1 containing the cyano group-containing polymer which was a polymer. This all-solid state secondary battery No. c21 had insufficient cycle characteristics. This is considered to be because the dispersibility of the cyano group-containing polymer was poor, and no chemical bonds were formed between the inorganic solid electrolyte and the polymer. In the all-solid state secondary battery No. c22 produced for comparison, the positive electrode layer containing no specific anionic polymer was formed using the comparative solid electrolyte composition T-2 containing the radical polymerizable monomer. This all-solid state secondary battery No. c22 had insufficient cycle characteristics. This is considered to be because no chemical bonds were formed between the inorganic solid electrolyte and the radical polymerizable monomer. In addition, the all-solid state secondary batteries Nos. c21 and c22 manufactured without using the method for manufacturing a solid electrolyte-containing sheet of the present invention had insufficient cycle characteristics.

The present invention has been described together with the embodiment; however, unless particularly designated, the present inventors do not intend to limit the present invention to any detailed portion of the description and consider that the present invention is supposed to be broadly interpreted within the concept and scope of the present invention described in the claims.

The present application claims priority on the basis of JP2016-044282 filed on Mar. 8, 2016 in Japan, the content of which is incorporated herein by reference.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery
11: coin case
12: sheet for all-solid state secondary battery
13: cell for measuring cycle characteristics (coin battery)

What is claimed is:

1. A solid electrolyte composition comprising:

an inorganic solid electrolyte having a conductivity for ions of metals belonging to Group I or II of the periodic table; and a compound having an anionic polymerizable functional group, wherein the compound having an anionic polymerizable functional group is represented by General Formula (1a) or (1b), General Formula (1a)

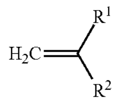

General Formula (1b)

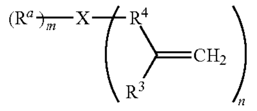

in the formula, $R^1$ to $R^3$ each independently represent a monovalent electron-withdrawing group, $R^4$ represents a divalent electron-withdrawing group in which a bonding portion with a carbon atom to which $R^3$ and $R^4$ bond withdraws electrons, $R^a$ represents a hydrogen atom or an organic group, X represents an m+n-valent linking group, m is an integer of 0 to 10, n is an integer of 2 to 10, and $R^1$, $R^2$, $R^3$ and $R^4$ may link together to form a ring.

2. The solid electrolyte composition according to claim 1, wherein the compound having an anionic polymerizable functional group satisfies the following conditions, (Conditions)

$R^1$ to $R^3$ each independently represent an alkyl group substituted with a nitro group, a cyano group, —C(═O)$OR^5$, —C(═O)$R^6$, or a fluoro group or an aryl group substituted with at least any one of a nitro group, a cyano group, —C(═O)$OR^5$, —C(═O)$R^6$, or a fluoro group, $R^4$ is an alkylene group substituted with *—C(═O)$OR^7$—, *—C(═O)$R^8$—, or a fluoro group or an arylene group substituted with at least any one of a nitro group, a cyano group, —C(═O)$OR^5$, —C(═O)$R^6$, or a fluoro group, $R^5$ and $R^6$ each are independently a hydrogen atom, an alkyl group, or an aryl group, and $R^7$ and $R^8$ each are independently a single bond, an alkylene group, or an arylene group, and * represents the bonding portion with the carbon atom to which $R^3$ and $R^4$ bond.

3. The solid electrolyte composition according to claim 1, wherein the compound having an anionic polymerizable functional group has two or more anionic polymerizable functional groups in a molecule.

4. The solid electrolyte composition according to claim 1, wherein a molecular weight of the compound having an anionic polymerizable functional group is 100 or more and 1,000 or less.

5. The solid electrolyte composition according to claim 1, wherein a content of the compound having an anionic polymerizable functional group is less than 2% by mass of total solid contents in the solid electrolyte composition.

6. The solid electrolyte composition according to claim 1, containing:

a dispersion medium.

7. The solid electrolyte composition according to claim 1, containing:

an active material.

8. The solid electrolyte composition according to claim 1, containing:

a particle dispersant.

9. The solid electrolyte composition according to claim 1, wherein the inorganic solid electrolyte is a sulfide-based inorganic solid electrolyte.

10. A method for manufacturing a solid electrolyte composition, the method comprising:

a step of dispersing an inorganic solid electrolyte in the presence of a dispersion medium so as to produce a slurry; and a step of adding a compound having an anionic polymerizable functional group to the obtained slurry.

11. A solid electrolyte-containing sheet comprising:

an inorganic solid electrolyte having a conductivity for ions of metals belonging to Group I or II of the periodic table; and an anionic polymer which bonds to the inorganic solid electrolyte and has a repeating unit represented by General Formula (2A) or (2B), General Formula (2A)

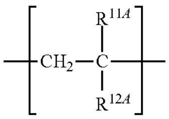

-continued

General Formula (2B)

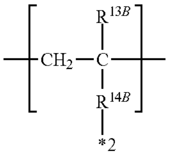

in the formula, $R^{11A}$ and $R^{12A}$ each independently represent a monovalent electron-withdrawing group, $R^{13B}$ represents a monovalent electron-withdrawing group or —$R^{14B}$—$*_2$, $R^{14B}$ represents a divalent electron-withdrawing group in which a bonding portion with a carbon atom to which $R^{13B}$ and $R^{14B}$ bond withdraws electrons, $*_2$ represents a bonding site, and $R^{11A}$, $R^{12A}$, $R^{13B}$, and $R^{14B}$ may link together to form a ring.

12. A method for manufacturing a solid electrolyte-containing sheet, the method comprising:

a step of applying the solid electrolyte composition according to claim 1 onto a base material to form a coating; and a step of curing the coating through progress of anionic polymerization.

13. A method for manufacturing a solid electrolyte-containing sheet, the method comprising:

a step of dispersing an inorganic solid electrolyte having a conductivity for ions of metals belonging to Group I or II of the periodic table in the presence of a dispersion medium so as to produce a slurry;

a step of applying the obtained slurry onto a base material to form a coating;

a step of applying a solution of a compound having an anionic polymerizable functional group onto the formed coating and infusing the solution into the coating so as to form a sheet; and a step of curing the formed sheet through progress of anionic polymerization, by comprising the anionic polymerizable functional group on the surface of the inorganic solid electrolyte, as species initiating the polymerization.

14. An all-solid state secondary battery comprising:

a negative electrode active material layer;

a solid electrolyte layer; and a positive electrode active material layer in this order, wherein at least one layer of the negative electrode active material layer, the solid electrolyte layer, or the positive electrode active material layer is composed of the solid electrolyte-containing sheet according to claim 11.

15. The all-solid state secondary battery according to claim 14, wherein a proportion of a repeating unit containing a cyano group in the repeating unit represented by General Formula (2A) or (2B) is more than 30% by mass.

16. A method for manufacturing an all-solid state secondary battery, wherein an all-solid state secondary battery is manufactured using the method for manufacturing a solid electrolyte-containing sheet according to claim 12.

* * * * *